(12) United States Patent
Matsui et al.

(10) Patent No.: US 11,078,372 B2
(45) Date of Patent: Aug. 3, 2021

(54) COATING LIQUID AND GAS BARRIER LAMINATE

(71) Applicant: TOPPAN PRINTING CO., LTD., Tokyo (JP)

(72) Inventors: Miyu Matsui, Tokyo (JP); Iori Takeuchi, Tokyo (JP); Masayuki Kashimura, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 125 days.

(21) Appl. No.: 15/955,166

(22) Filed: Apr. 17, 2018

(65) Prior Publication Data

US 2018/0230319 A1    Aug. 16, 2018

Related U.S. Application Data

(63) Continuation of application No. PCT/JP2016/080937, filed on Oct. 19, 2016.

(30) Foreign Application Priority Data

Oct. 20, 2015  (JP) .............................. JP2015-206205

(51) Int. Cl.
*C09D 7/60* (2018.01)
*B32B 27/36* (2006.01)
(Continued)

(52) U.S. Cl.
CPC ................. *C09D 7/60* (2018.01); *B32B 7/12* (2013.01); *B32B 27/18* (2013.01); *B32B 27/36* (2013.01); *C09D 7/40* (2018.01); *C09D 7/61* (2018.01); *C09D 167/00* (2013.01); *C09D 175/06* (2013.01); *B32B 27/20* (2013.01); *B32B 2250/02* (2013.01); *B32B 2250/03* (2013.01); *B32B 2250/24* (2013.01); *B32B 2255/10* (2013.01); *B32B 2255/26* (2013.01);
(Continued)

(58) Field of Classification Search
None
See application file for complete search history.

(56) References Cited

U.S. PATENT DOCUMENTS 4,217,109 A  *  8/1980  Siwersson .............. B03D 1/016
                                                                 423/461
4,735,995 A  *  4/1988  Chettiath .............. C08F 257/02
                                                                 524/529
(Continued)

FOREIGN PATENT DOCUMENTS

EP    2 351 803 A1    8/2011
EP    2 918 649 A1    9/2015
(Continued)

OTHER PUBLICATIONS

International Search Report dated Dec. 13, 2016 in corresponding International Patent Application No. PCT/JP2016/080937.
(Continued)

*Primary Examiner* — Vivian Chen

(57) ABSTRACT

A coating liquid includes: ultrafine zinc oxide particles; a polyester resin; an ammonium polycarboxylate salt; and water, in which an amount of the ammonium polycarboxylate salt is from 1 to 35 mass % with respect to that of the ultrafine zinc oxide particles.

6 Claims, 2 Drawing Sheets

(51) Int. Cl.

| | |
|---|---|
| *C09D 167/00* | (2006.01) |
| *B32B 27/18* | (2006.01) |
| *C09D 175/06* | (2006.01) |
| *C09D 7/40* | (2018.01) |
| *C09D 7/61* | (2018.01) |
| *B32B 7/12* | (2006.01) |
| *B32B 27/20* | (2006.01) |
| *C09D 133/02* | (2006.01) |
| *C09D 167/02* | (2006.01) |
| *C08L 67/00* | (2006.01) |
| *C08L 67/02* | (2006.01) |
| *C08L 33/02* | (2006.01) |
| *C08K 3/013* | (2018.01) |
| *C08K 3/20* | (2006.01) |
| *C08K 3/22* | (2006.01) |

(52) U.S. Cl.
CPC ....... *B32B 2255/28* (2013.01); *B32B 2264/10* (2013.01); *B32B 2264/1025* (2020.08); *B32B 2307/412* (2013.01); *B32B 2307/7242* (2013.01); *B32B 2307/7244* (2013.01); *B32B 2333/00* (2013.01); *B32B 2367/00* (2013.01); *C08K 3/013* (2018.01); *C08K 3/20* (2013.01); *C08K 3/22* (2013.01); *C08K 2003/2296* (2013.01); *C08L 33/02* (2013.01); *C08L 67/00* (2013.01); *C08L 67/02* (2013.01); *C08L 2201/10* (2013.01); *C08L 2201/14* (2013.01); *C08L 2201/54* (2013.01); *C09D 7/66* (2018.01); *C09D 7/67* (2018.01); *C09D 7/68* (2018.01); *C09D 133/02* (2013.01); *C09D 167/02* (2013.01); *Y10T 428/1341* (2015.01); *Y10T 428/1379* (2015.01); *Y10T 428/1383* (2015.01); *Y10T 428/31797* (2015.04); *Y10T 428/31909* (2015.04); *Y10T 428/31928* (2015.04); *Y10T 428/31938* (2015.04)

(56) References Cited

U.S. PATENT DOCUMENTS

| | | | | |
|---|---|---|---|---|
| 5,006,380 A * | 4/1991 | Fraser | | B32B 27/32 428/35.2 |
| 5,431,956 A * | 7/1995 | Robb | | C08F 292/00 427/220 |
| 6,200,680 B1 * | 3/2001 | Takeda | | A61K 8/27 423/111 |
| 2005/0069706 A1 * | 3/2005 | Kessell | | A61K 8/11 428/403 |
| 2005/0131162 A1 * | 6/2005 | Tanaka | | B32B 27/06 525/329.7 |
| 2006/0228310 A1 * | 10/2006 | Lyth | | A61K 8/044 424/59 |
| 2007/0059518 A1 * | 3/2007 | Tanaka | | B32B 27/08 428/328 |
| 2007/0134507 A1 * | 6/2007 | Yamasaki | | C08J 5/18 428/500 |
| 2008/0057008 A1 * | 3/2008 | Naden | | A61K 8/29 424/59 |
| 2008/0269403 A1 * | 10/2008 | Kruithof | | C09B 67/009 524/556 |
| 2009/0022981 A1 * | 1/2009 | Yoshida | | C08J 7/045 428/336 |
| 2009/0047529 A1 * | 2/2009 | Kawashima | | B05D 7/04 428/458 |
| 2009/0171003 A1 * | 7/2009 | Nishiura | | B32B 27/08 524/503 |
| 2009/0191273 A1 * | 7/2009 | Kessell | | A61K 8/26 424/489 |
| 2009/0269592 A1 * | 10/2009 | Hakamata | | B32B 27/08 428/446 |
| 2009/0280333 A1 * | 11/2009 | Kuwata | | B32B 7/12 428/423.7 |
| 2009/0324836 A1 * | 12/2009 | Tsurugi | | B01J 41/04 427/385.5 |
| 2010/0015431 A1 * | 1/2010 | Matsui | | B29C 66/72324 428/323 |
| 2010/0035050 A1 * | 2/2010 | Okawara | | C08J 7/0423 428/336 |
| 2010/0096601 A1 * | 4/2010 | DiStefano | | B01F 17/0057 252/572 |
| 2010/0151265 A1 * | 6/2010 | Okuzu | | C08J 7/045 428/522 |
| 2010/0239852 A1 * | 9/2010 | Okuzu | | C08J 7/04 428/328 |
| 2011/0033716 A1 * | 2/2011 | Nishiura | | C09D 7/67 428/447 |
| 2011/0200836 A1 * | 8/2011 | Obu | | B32B 27/32 428/500 |
| 2011/0217561 A1 * | 9/2011 | Fujimura | | B32B 9/045 428/480 |
| 2012/0003500 A1 * | 1/2012 | Yoshida | | C09D 5/00 428/688 |
| 2012/0164203 A1 * | 6/2012 | Premachandran | | A01N 25/04 424/408 |
| 2012/0219806 A1 * | 8/2012 | Miyai | | C08J 7/042 428/424.4 |
| 2012/0238696 A1 * | 9/2012 | Obu | | C09D 5/002 524/590 |
| 2013/0273374 A1 * | 10/2013 | Kawai | | C08J 7/04 428/422.8 |
| 2014/0154517 A1 * | 6/2014 | Sasaoka | | B32B 7/12 428/423.7 |
| 2014/0227515 A1 * | 8/2014 | Takano | | B32B 27/30 428/354 |
| 2014/0329039 A1 * | 11/2014 | Neuman | | B65D 75/42 428/36.6 |
| 2015/0079405 A1 * | 3/2015 | Nangou | | C08K 3/08 428/422.8 |
| 2015/0086777 A1 * | 3/2015 | Abe | | B32B 27/308 428/336 |
| 2015/0232683 A1 * | 8/2015 | Oto | | C09D 133/02 524/432 |
| 2015/0251389 A1 * | 9/2015 | Maehara | | B32B 27/36 428/35.4 |
| 2016/0024327 A1 * | 1/2016 | Ookawa | | C09D 5/028 523/458 |
| 2016/0075910 A1 * | 3/2016 | Omori | | C08J 7/047 428/480 |
| 2016/0229605 A1 * | 8/2016 | Omori | | B32B 27/00 |
| 2017/0210909 A1 * | 7/2017 | Kidokoro | | B32B 27/30 |
| 2018/0126696 A1 * | 5/2018 | Suzuki | | B32B 7/02 |

FOREIGN PATENT DOCUMENTS

| | | | |
|---|---|---|---|
| WO | WO 03/091317 A1 | | 11/2003 |
| WO | WO 2010/061705 A1 | | 6/2010 |
| WO | WO 2014/073482 A | * | 5/2014 |
| WO | WO 2014/192500 A | * | 12/2014 |
| WO | WO 2015/060147 A | * | 4/2015 |

OTHER PUBLICATIONS

Extended European Search Report dated Mar. 1, 2019 in corresponding European Patent Application No. 16857456.4 (6 pages).

* cited by examiner

COATING LIQUID AND GAS BARRIER LAMINATE

CROSS REFERENCE TO RELATED APPLICATIONS

This application is a continuation application based on a PCT Patent Application No. PCT/JP2016/080937, filed Oct. 19, 2016, whose priority is claimed on Japanese Patent Application No. 2015-206205, filed on Oct. 20, 2015, the entire contents of which are hereby incorporated by reference.

BACKGROUND OF THE INVENTION

Field of the Invention

The present invention relates to a coating liquid and a gas barrier laminate.
Priority is claimed on Japanese Patent Application No. 2015-206205, filed on Oct. 20, 2015, the amount of which is incorporated herein by reference.

Description of the Related Art

Gas barrier films formed by coating a coating liquid containing a polyvalent metal compound such as zinc oxide on a layer containing polyacrylic acid are known (for example, PCT International Publication No. WO 2003/091317).

PCT International Publication No. WO 2003/091317 (hereinafter, referred to as Patent Document 1) discloses that in a case where water is used as a solvent of a coating liquid containing a polyvalent metal compound, when the coating liquid is coated on a layer formed from a polycarboxylate polymer, the polycarboxylate polymer and the polyvalent metal compound react with each other to generate a non-uniform precipitate. In addition, Patent Document 1 discloses that it is preferable to use a non-aqueous solvent or a mixed solvent of water and a non-aqueous solvent as the solvent of the coating liquid. However, from the viewpoint of reducing the environmental burden, in recent years, there has been a demand for a coating liquid which does not use an organic solvent as a solvent, that is, which uses water as a solvent.

As a coating liquid in which a polyvalent metal compound is contained in water, for example, a coating liquid containing ultrafine particles of zinc oxide (hereinafter, also referred to as ultrafine zinc oxide particles) is known. However, ultrafine zinc oxide particles generally do not have good dispersibility in water. Therefore, in layers formed by coating such a coating liquid, the concentration of the ultrafine zinc oxide particles is not uniform.

PCT International Publication No. WO 2010/061705 (hereinafter, referred to as Patent Document 2) proposes a coating liquid including ultrafine inorganic compound particles, a polyester resin, sodium polycarboxylate, and water. Patent Document 2 discloses that using a sodium polycarboxylate salt as a dispersing agent gives the ultrafine inorganic compound particles in this coating liquid good dispersibility. In addition, Patent Document 2 discloses that a gas barrier laminate having a layer formed from this coating liquid and a layer containing polyacrylic acid is excellent in transparency and in the gas barrier property.

SUMMARY

However, according to the studies of the present inventors, a gas barrier laminate having a layer formed from the coating liquid disclosed in the Patent Document 2 does not have sufficient hot water resistance, that is, the gas barrier property after hot water treatments such as retort treatments and boiling treatments is not sufficient.

The Patent Document 2 proposes using a water-dispersible isocyanate compound for improving hot water resistance and the like, but even if a water-dispersible isocyanate compound is blended therein, the hot water resistance is still insufficient.

In addition, the coating liquid disclosed in the Patent Document 2 has a problem in that the dispersion stability of the ultrafine zinc oxide particles decreases after the addition of the water-dispersible isocyanate compound and the period during which it is possible to maintain the dispersed state of the ultrafine zinc oxide particles is short.

The present invention was made in view of the circumstances described above and has an object of providing an aqueous coating liquid capable of forming a gas barrier laminate in which the dispersion stability of ultrafine inorganic compound particles is good and which has excellent hot water resistance, and a gas barrier laminate which has a layer formed from the coating liquid and which is excellent in hot water resistance.

As a result of intensive research, the present inventors found that it is possible to solve the problems described above by using an ammonium polycarboxylate salt as a dispersing agent, thus completing the present invention.

The present invention has the following aspects.

A coating liquid according to a first aspect of the present invention includes ultrafine zinc oxide particles; a polyester resin; an ammonium polycarboxylate salt; and water, wherein an amount of the ammonium polycarboxylate salt is from 1 to 35 mass % with respect to that of the ultrafine zinc oxide particles.

The coating liquid according to the first aspect may further include a water-dispersible isocyanate compound.

In the first aspect, the acid value of the polyester resin may be 15 mg KOH/g or less.

A gas barrier laminate according to a second aspect of the present invention includes a base material; and a gas barrier layer formed on the base material and having a layer (A) formed from the coating liquid according to the first aspect, and a layer (B) containing a polycarboxylate polymer.

In the second aspect, the layer (A) and the layer (B) may be adjacent to each other in the gas barrier layer.

In the second aspect, a mass per unit area of the layer (A) may be ⅓ or more times a mass per unit area of the layer (B).

The second aspect may further include another base material laminated on at least one of the base material and the gas barrier layer via an adhesive layer.

In the coating liquid according to the above aspect of the present invention, the dispersion stability of the ultrafine zinc oxide particles is good. In addition, according to the coating liquid according to the above aspect of the present invention, it is possible to produce a gas barrier laminate excellent in hot water resistance.

The hot water resistance of the gas barrier laminate according to the above aspect of the present invention having a layer formed from the coating liquid according to the above aspect of the present invention is excellent.

DETAILED DESCRIPTION OF THE PREFERRED EMBODIMENTS

Coating Liquid

Figure 1:
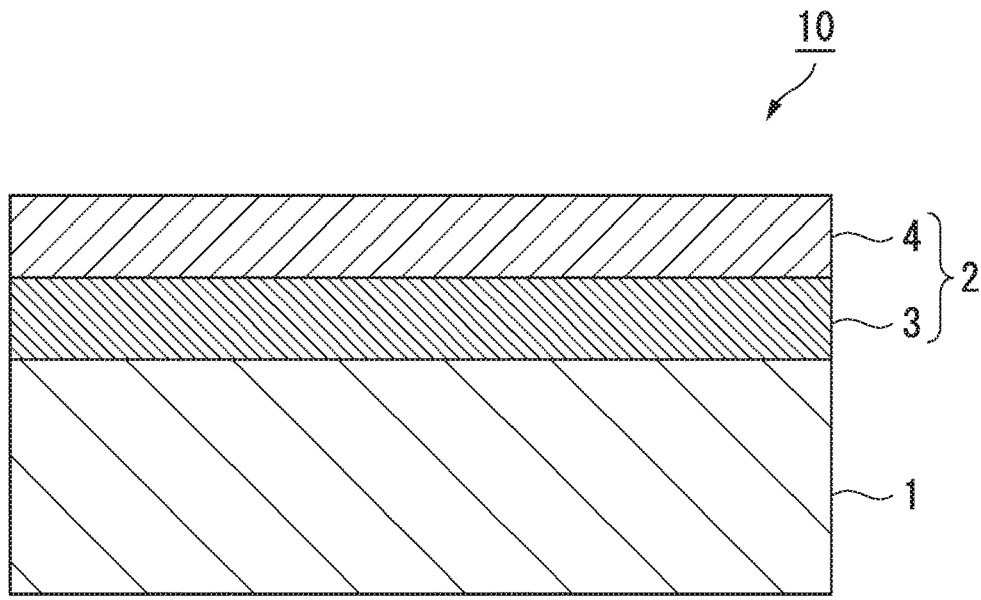
FIG. 1 is a cross-sectional view schematically showing a gas barrier laminate according to a second embodiment of the present invention.

A coating liquid according to the first embodiment of the present invention (hereinafter, also referred to as a coating liquid (a)) includes ultrafine zinc oxide particles, a polyester resin having an acid value of 15 mg KOH/g or less, an ammonium polycarboxylate salt, and water.

The coating liquid (a) preferably further includes a water-dispersible isocyanate compound.

The coating liquid (a) may further include other components than the above-described ultrafine zinc oxide particles, polyester resin having an acid value of 15 mg KOH/g or less, ammonium polycarboxylate salt, water, and water-dispersible isocyanate compound.

Ultrafine Zinc Oxide Particles

In the present embodiment, the "ultrafine particles" means particles having an average primary particle diameter of 1 nm to 1000 nm as measured by a laser diffraction scattering method.

The average primary particle diameter of the ultrafine zinc oxide particles is preferably 200 nm or less, more preferably 150 nm or less, and particularly preferably 100 nm or less. In addition, the average primary particle diameter of the ultrafine zinc oxide particles is preferably 5 nm or more.

When the average primary particle diameter of the ultrafine zinc oxide particles is the upper limit (200 nm) described above or less, the dispersibility of the ultrafine zinc oxide particles in the coating liquid (a) is excellent and the liquid stability is good. In addition, the layer obtained by coating and drying the coating liquid (a) on a base material such as a film is excellent in transparency.

As the ultrafine zinc oxide particles, commercially available products may be used. Examples of commercially available products of ultrafine zinc oxide particles include FINEX® 50 (manufactured by Sakai Chemical Industry Co., Ltd., average primary particle diameter: 20 nm), ZINCOX SUPER F-2 (manufactured by HakusuiTECH Co., Ltd., average primary particle diameter: 65 nm), and the like.

Polyester Resin

The polyester resin functions as a binder of the ultrafine zinc oxide particles.

Examples of polyester resins include a copolymer (polycondensate) of either one or both of a polybasic acid and a polybasic acid anhydride, and a polyhydric alcohol. Each of the polybasic acid, the polybasic acid anhydride, and the polyhydric alcohol forming the polyester resin may be one kind or two or more kinds respectively.

The polybasic acid is not particularly limited, and examples thereof include aromatic polybasic acids, aliphatic polybasic acids, alicyclic polybasic acids, and the like. In addition, as the polybasic acid, a bifunctional polybasic acid may be used, or a trifunctional or higher polybasic acid may be used.

Examples of bifunctional aromatic polybasic acids, that is, aromatic dicarboxylic acids, include terephthalic acid, isophthalic acid, orthophthalic acid, naphthalene dicarboxylic acid, biphenyl dicarboxylic acid, and the like. Examples of bifunctional aliphatic polybasic acids, that is, aliphatic dicarboxylic acids, include saturated aliphatic dicarboxylic acids such as oxalic acid, succinic acid, adipic acid, sebacic acid, dodecanedioic acid, eicosanedioic acid, and hydrogenated dimer acid; and unsaturated aliphatic dicarboxylic acids such as fumaric acid, maleic acid, itaconic acid, citraconic acid, and dimer acid. Examples of bifunctional alicyclic polybasic acids, that is, alicyclic dicarboxylic acids, include 1,4-cyclohexane dicarboxylic acid, 1,3-cyclohexane dicarboxylic acid, 1,2-cyclohexane dicarboxylic acid, 2,5-norbornene dicarboxylic acid, tetrahydrophthalic acid, and the like.

Examples of trifunctional or higher polybasic acids include trimellitic acid, pyromellitic acid, benzophenonetetracarboxylic acid, trimesic acid, ethylene glycol bis (anhydrotrimellitate), glycerol tris (anhydrotrimellitate), 1,2,3,4-butanetetracarboxylic acid, and the like.

The polybasic acid anhydride is not particularly limited, and examples thereof include acid anhydrides of the polybasic acids described above. As the polybasic acid anhydride, an acid anhydride of a bifunctional polybasic acid may be used, or an acid anhydride of a trifunctional or higher polybasic acid may be used.

Examples of acid anhydrides of the bifunctional polybasic acid include phthalic anhydride, succinic anhydride, maleic anhydride, itaconic anhydride, citraconic anhydride, 2,5-norbornene dicarboxylic anhydride, tetrahydrophthalic anhydride, and the like. Examples of acid anhydrides of the trifunctional or higher polybasic acid include trimellitic anhydride, pyromellitic anhydride, benzophenonetetracarboxylic anhydride, and the like.

From the viewpoint of suppressing gelation during the production of the polyester resin, in a case where the total of the polybasic acid and the polybasic acid anhydride is 100 mol %, the total amount of the trifunctional or higher polybasic acid and the acid anhydride of a trifunctional or higher polybasic acid is preferably 5 mol % or less. That is, it is preferable that the total amount of the bifunctional polybasic acid and the acid anhydride of a bifunctional polybasic acid is 95 mol % or more.

Among the polybasic acids and polybasic acid anhydrides, aromatic dicarboxylic acids and acid anhydrides of aromatic dicarboxylic acids such as phthalic anhydride are preferable.

The polyhydric alcohol is not particularly limited, and a bifunctional polyhydric alcohol may be used, or a trifunctional or higher polyhydric alcohol may be used.

Examples of bifunctional polyhydric alcohols include aliphatic glycols having 2 to 10 carbon atoms, alicyclic glycols having 6 to 12 carbon atoms, ether bond-containing glycols, ethylene oxide or propylene oxide adducts of bisphenols, and the like.

Examples of aliphatic glycols having 2 to 10 carbon atoms include ethylene glycol, 1,2-propanediol, 1,3-propanediol, 1,4-butanediol, 2-methyl-1,3-propanediol, 1,5-heptanediol, neopentyl glycol, 1,6-hexanediol, 3-methyl-1,5-pentanediol, 1,9-nonanediol, 2-ethyl-2-butylpropanediol, and the like. Examples of alicyclic glycols having 6 to 12 carbon atoms include 1,4-cyclohexanedimethanol. Examples of ether bond-containing glycols include diethylene glycol, triethylene glycol, dipropylene glycol, polytetramethylene glycol, polyethylene glycol, polypropylene glycol, and the like. Examples of bisphenols in ethylene oxide or propylene oxide adducts of bisphenols include 2,2-bis (4-(2-hydroxyethoxy) phenyl) propane, bisphenol A, bisphenol S, and the like.

Examples of trifunctional or higher polyhydric alcohols include glycerin, trimethylolethane, trimethylolpropane, pentaerythritol, and the like.

From the viewpoint of suppressing gelation during the production of the polyester resin, the amount of the trifunctional or higher polyhydric alcohol is preferably 5 mol % or less with respect to 100 mol % of the polyhydric alcohol. That is, the amount of the bifunctional polyhydric alcohol is preferably 95 mol % or more.

Ethylene glycol and neopentyl glycol are preferable as polyhydric alcohols from the viewpoint of low cost.

The total amount of ethylene glycol and neopentyl glycol in 100 mol % of the polyhydric alcohol is preferably 50 mol % or more, more preferably 70 mol % or more, and may be 100 mol %.

In the polyester resin, at least one selected from the group consisting of a monocarboxylic acid, a monoalcohol, a lactone, and a hydroxycarboxylic acid may be copolymerized together with either one or both of the polybasic acid and polybasic acid anhydride and a polyhydric alcohol. Specific examples of monocarboxylic acid, monoalcohol, lactone, or hydroxycarboxylic acid include lauric acid, myristic acid, palmitic acid, stearic acid, oleic acid, linoleic acid, linolenic acid, benzoic acid, p-tert-butylbenzoic acid, cyclohexanoic acid, 4-hydroxyphenyl stearic acid, stearyl alcohol, 2-phenoxyethanol, □-caprolactone, lactic acid, □-hydroxybutyric acid, p-hydroxybenzoic acid, and the like.

It is possible for copolymerization (polycondensation) of either one or both of the polybasic acid and the polybasic acid anhydride with the polyhydric alcohol to be carried out by a known method. Example methods include methods in which an esterification reaction is performed by reacting either of all monomers or low polymers thereof, or both of the all monomers and the low polymers in an inert atmosphere at 180° C. to 260° C. for approximately 2.5 to 10 hours. Then, a polycondensation reaction is carried out using a transesterification catalyst under a reduced pressure of 130 Pa or less at a temperature of 220° C. to 280° C. until reaching to a desired molecular weight, to obtain a polyester resin.

As a method for imparting a desired acid value or hydroxyl value to the polyester resin, for example, there is a method in which a polybasic acid or a polyhydric alcohol is further added following the polycondensation reaction described above and depolymerization is carried out in an inert atmosphere. When a polybasic acid is added, the acid value increases, and when a polyhydric alcohol is added, the hydroxyl value increases.

There is a case when depolymerization is carried out, bubbles are generated in the resin and, when pelletizing is carried out, it may not be possible to form pellets due to the bubbles. In such a case, after depolymerization, the interior of the system may be re-depressurized and degassed. The degree of reduced pressure when re-depressurizing is preferably 67,000 Pa or less, and more preferably 10,000 Pa or less. When the degree of reduced pressure is higher than 67,000 Pa, the time required for defoaming becomes long even if re-depressurizing is performed, which is not preferable.

In addition, examples of a method for imparting a desired acid value to the polyester resin also include a method in which a polybasic acid anhydride is further added following the polycondensation reaction and an addition reaction is carried out with a hydroxyl group of the polyester resin in an inert atmosphere.

As the polyester resin, a polyester resin having a carboxyl group introduced by at least one of depolymerization using a polybasic acid and addition reaction using a polybasic acid anhydride is preferable. Introducing a carboxyl group by at least one of depolymerization and addition reaction makes it possible to easily control the molecular weight and acid value of the polyester resin.

The polybasic acid used in the depolymerization preferably includes a trifunctional or higher polybasic acid.

Using a trifunctional or higher polybasic acid makes it possible to impart a desired acid value while suppressing a reduction in the molecular weight of the polyester resin by depolymerization. In addition, although the details thereof are unknown, using a trifunctional or higher polybasic acid or an acid anhydride of a trifunctional or higher polybasic acid for the depolymerization or addition reaction makes it possible to obtain an aqueous dispersion having superior storage stability.

Examples of the polybasic acid or the acid anhydride of the polybasic acid used in the depolymerization and addition reaction include the same compounds as the compounds described above. Among these, aromatic polybasic acids and acid anhydrides of aromatic polybasic acids are preferable, and terephthalic acid and isophthalic acid, which are aromatic dicarboxylic acids, phthalic anhydride which is an acid anhydride of aromatic dicarboxylic acid, trimellitic acid, which is a trifunctional polybasic acid, and trimellitic anhydride, which is an acid anhydride of a trifunctional polybasic acid, are preferable. In particular, in a case where a trimellitic anhydride is used, the depolymerization and addition reaction are considered to occur in parallel. From this, it is particularly preferable to use a trimellitic anhydride since it is possible to impart a desired acid value while greatly suppressing a decrease in the molecular weight of the polyester resin due to depolymerization.

Polyester Resin Properties

The acid value of the polyester resin is not particularly limited, but is 15 mg KOH/g or less, preferably 10 mg KOH/g or less, and more preferably 8 mg KOH/g or less. When the acid value is the upper limit (15 mg KOH/g) or less, the gas barrier laminate having the layer formed from the coating liquid (a) has excellent hot water resistance.

The lower limit of the acid value of the polyester resin is not particularly limited, but is usually 0.05 mg KOH/g or more in terms of the limit of measurement precision.

The acid value of the polyester resin is measured in accordance with JIS K 0070: 1992.

The polyester resin may include a hydroxyl group within a range not impairing the hot water resistance of the layer formed from the coating liquid (a).

The hydroxyl value of the polyester resin is preferably 30 mg KOH/g or less, and more preferably 20 mg KOH/g or less. The lower limit of the hydroxyl value of the polyester resin is not particularly limited, but is usually 0.05 mg KOH/g or more in terms of the limits of measurement precision.

The glass transition temperature (Tg) of the polyester resin is preferably −30° C. or higher, more preferably 20° C. or higher, and particularly preferably 50° C. or higher. When the Tg is the lower limit (−30° C.) or higher, the gas barrier laminate having the layer formed from the coating liquid (a) has superior hot water resistance.

The upper limit of the glass transition temperature (Tg) of the polyester resin is not particularly limited, but is typically 80° C. or less.

The number average molecular weight of the polyester resin is preferably 5,000 to 50,000, more preferably 9,000 to 40,000, and particularly preferably 10,000 to 30,000. When the number average molecular weight is within the above range, the gas barrier laminate having the layer formed from the coating liquid (a) has superior hot water resistance.

The polyester resin included in the coating liquid (a) may be one kind or two or more kinds.

From the viewpoint of the coating property of the coating liquid (a), the polyester resin is preferably dissolved or dispersed in the coating liquid (a).

The polyester resin included in the coating liquid (a) is preferably derived from an aqueous polyester resin dispersion. When a polyester resin derived from an aqueous polyester resin dispersion is included, the hot water resistance of the layer formed from the coating liquid (a) is superior.

Aqueous Polyester Resin Dispersion

The aqueous polyester resin dispersion includes a polyester resin and water, which is the dispersion medium.

The aqueous polyester resin dispersion preferably further includes a basic compound in order to satisfactorily disperse the polyester resin in water.

The aqueous polyester resin dispersion may further include other components. Other components are not particularly limited, but examples thereof include surfactants, organic solvents, curing agents, compounds having a protective colloid action, pigments such as titanium oxide, zinc white, and carbon black, dyes, aqueous resins such as aqueous urethane resins, aqueous olefin resins, aqueous acrylic resins, and the like.

Commercial products may be used as the aqueous polyester resin dispersion, and examples thereof include Elitel® KT-8803, Elitel KT-0507, Elitel KT-9204 (the above are manufactured by Unitika Ltd.), Vylonal® MD-1200, Vylonal MD-1480 (the above are manufactured by Toyobo Co., Ltd.), Pesresin A 124 GP (manufactured by Takamatsu Oil & Fat Co., Ltd.), and the like.

Ammonium Polycarboxylate Salt

Examples of ammonium polycarboxylate salts include an ammonium salt of a homopolymer of unsaturated carboxylic acid or a copolymer thereof.

Examples of unsaturated carboxylic acids include acrylic acid, maleic acid, methacrylic acid, itaconic acid, fumaric acid, crotonic acid, and the like.

Ammonium salts of copolymers of unsaturated carboxylic acids include ammonium salts of copolymers of two or more unsaturated carboxylic acids, ammonium salts of copolymers of one or more unsaturated carboxylic acids with one or more other monomers, and the like. The ammonium salt of a copolymer of two or more unsaturated carboxylic acids may be an ammonium salt of a copolymer of two or more unsaturated carboxylic acids and another monomer.

The ammonium polycarboxylate salt may also be an ammonium polycarboxylate salt obtained by neutralizing a carboxyl group included in a polycarboxylic acid obtained by (co)polymerizing an unsaturated carboxylic acid, with ammonia. In addition, the ammonium polycarboxylate salt may also be an ammonium polycarboxylate salt obtained by (co)polymerizing an ammonium salt of an unsaturated carboxylic acid.

The ammonium polycarboxylate salt may be used alone or a combination of two or more kinds may be used thereof.

Commercial products may be used as the ammonium polycarboxylate salt, and examples thereof include Aron® A-30SL and Aron A-6114 (the above are manufactured by Toagosei Co., Ltd.), Nopcospers® 5600, Nopcosant RFA, SN Dispersant 5020, SN Dispersant 5023, and SN Dispersant 5027 (the above are manufactured by San Nopco Limited), Shallol® AH-103P (manufactured by DKS Co., Ltd.), Polystar® OMA, Malialim® HKM-50A, Polystar OMA, and Malialim HKM-150A (the above are manufactured by NOF Corp.), Celna D-305 (manufactured by Chukyo Yushi Co., Ltd.), and the like.

Water-Dispersible Isocyanate Compound

The water-dispersible isocyanate compound means a compound having dispersibility in water and having at least one isocyanate group in the molecule thereof.

When the water-dispersible isocyanate compound is included in the coating liquid (a), the hot water resistance of the layer formed from the coating liquid (a) is superior. In addition, it is possible to prevent the ultrafine zinc oxide particles from falling off (falling as powder) from the layer formed from the coating liquid (a).

It is possible to use various compounds as the water-dispersible isocyanate compound. Examples thereof include (1) a self-emulsifying isocyanate compound obtained by a part of isocyanate groups of an organic polyisocyanate compound having two or more isocyanate groups in one molecule being modified with a hydrophilic group such as polyethylene oxide, a carboxyl group, or a sulfonic acid group, (2) an isocyanate compound which is forcibly emulsified by a surfactant or the like to become water-dispersible, (3) various prepolymers derived from the organic polyisocyanate, (4) a compound, that is, a so-called blocked polyisocyanate compound, obtained by blocking a part of the isocyanate group in the organic polyisocyanate with a blocking agent such as alcohols, phenols, oximes, mercaptans, amides, imides or lactams, and the like.

Examples of the organic polyisocyanate compound described above include phenylene diisocyanate, tolylene diisocyanate, diphenylmethane diisocyanate, xylylene diisocyanate, naphthylene diisocyanate, isophorone diisocyanate, hexamethylene diisocyanate, hydrogenated diphenylmethane diisocyanate, polymethylene polyphenyl polyisocyanate, hydrogenated toluene diisocyanate, or tetramethylene xylylene diisocyanate, without being particularly limited thereto. The above may be used alone or a combination of two or more may be used.

Commercially available products may be used as the water-dispersible isocyanate compound and examples thereof include Basonat® HW1000 NG (manufactured by BASF), Duranate® WB 40-100 (manufactured by Asahi Kasei Chemicals Corporation), Takenate® WD-725 (manufactured by Mitsui Chemical Polyurethane Co., Ltd.), and the like.

Other Components

Other components include organic solvents, softening agents, stabilizers, film formers, thickeners, and the like.

From the viewpoint of the coating property and drying efficiency improvement, examples of organic solvents include ethyl alcohol, isopropyl alcohol, ethylene glycol monobutyl ether, and the like. In a case where these organic solvents are included in the coating liquid (a), these may be included alone or in a combination of two or more.

Amount of Each Component in Coating Liquid (a)

The solid content concentration of the coating liquid (a) is preferably 3 to 30 mass %, and more preferably 5 to 20 mass %.

The solid content concentration is the ratio of the solid content to the total amount (100 mass %) of the coating liquid. The solid content of the coating liquid (a) is the total amount of the ultrafine zinc oxide particles, a polyester resin, an ammonium polycarboxylate salt, a water-dispersible isocyanate compound, and the solid components among the other components in the coating liquid (a). The total amount also includes a case where the water-dispersible isocyanate compound is not included or a case where the solid components from among the other components are not included.

The amount of the ultrafine zinc oxide particles in the coating liquid (a) is preferably 20 to 90 mass % with respect to the solid content (100 mass %), and more preferably 50 to 90 mass %. When the amount of the ultrafine zinc oxide particles is within the above range, the gas barrier property of the gas barrier laminate having the layer formed from the coating liquid (a) is superior.

The amount of the polyester resin in the coating liquid (a) is preferably 2 to 20 mass % with respect to the solid content (100 mass %), and more preferably 2 to 15 mass %. When the amount of the polyester resin is within the above range, the gas barrier laminate having the layer formed from the coating liquid (a) has superior hot water resistance and transparency.

The amount of the ammonium polycarboxylate salt in the coating liquid (a) is 1 to 35 mass % with respect to the ultrafine zinc oxide particles (100 mass %), and preferably 2 to 30 mass %.

When the amount of the ammonium polycarboxylate salt is within the above range, the liquid stability of the coating liquid (a), the gas barrier property and the hot water resistance of the gas barrier laminate having the layer formed from the coating liquid (a) are excellent.

The amount of the ammonium polycarboxylate salt in the coating liquid (a) is preferably 0.7 to 22 mass % with respect to the solid content (100 mass %), and more preferably 1.5 to 20 mass %. When the amount of the ammonium polycarboxylate salt is within the above range, the liquid stability of the coating liquid (a), the gas barrier property of the gas barrier laminate having the layer formed from the coating liquid (a), and the hot water resistance are superior.

In a case where the coating liquid (a) includes a water-dispersible isocyanate compound, the amount of the water-dispersible isocyanate compound in the coating liquid (a) is preferably 1 to 20 mass % with respect to the solid content (100 mass %), and more preferably 3 to 15 mass %. When the amount of the water-dispersible isocyanate compound is within the above range, the gas barrier laminate having the layer formed from the coating liquid (a) has superior hot water resistance. In addition, the adhesion is excellent when another base material is laminated on the layer formed from the coating liquid (a) via an adhesive layer.

The amount of the solid component among the other components in the coating liquid (a) is preferably less than 5 mass % with respect to the solid content (100 mass %), and more preferably less than 3 mass %. In other words, the total amount of the ultrafine zinc oxide particles, the polyester resin, the ammonium polycarboxylate salt and the water-dispersible isocyanate compound in the coating liquid (a) is preferably greater than 95 mass % with respect to the solid content (100 mass %), and more preferably greater than 97 mass %.

Method for Preparing Coating Liquid (a)

The method of preparing the coating liquid (a) is not particularly limited, and it is possible to obtain the coating liquid (a) by mixing the above components so as to be uniform.

In the present embodiment, it is preferable that the polyester resin is derived from the aqueous polyester resin dispersion as described above. In addition, as a method of preparing the coating liquid (a), a method of mixing ultrafine zinc oxide particles, an aqueous polyester resin dispersion, an ammonium polycarboxylate salt and, as necessary, water, a water-dispersible isocyanate compound, and other components is preferable.

Examples of methods for preparing the coating liquid (a) include the following methods. That is, example methods include a method in which ultrafine zinc oxide particles and ammonium polycarboxylate salt are added to distilled water, and aggregations of primary particles of the ultrafine zinc oxide particles are disintegrated and dispersed. Due to this, an aqueous dispersion of ultrafine zinc oxide particles is obtained, and distilled water, an aqueous polyester resin dispersion, and a water-dispersible isocyanate compound are added to the aqueous ultrafine zinc oxide particle dispersion and stirred. As necessary, an organic solvent such as isopropyl alcohol is added and stirred. The coating liquid (a) is obtained as a result.

It is possible to use a bead mill, a high-speed stirrer, or the like for disintegration of aggregations when the aqueous ultrafine zinc oxide particle dispersion is obtained. In particular, when a bead mill is used, the haze of the obtained gas barrier laminate tends to be small, which is preferable.

Other examples of the method of preparing the coating liquid (a) include the following methods. That is, example methods include a method in which distilled water is added to the water-dispersible isocyanate compound in advance and stirred to obtain an aqueous dispersion of the water-dispersible isocyanate compound. Separately, an aqueous dispersion of ultrafine zinc oxide particles is obtained with the same method as described above, and an aqueous polyester resin dispersion is added to the aqueous ultrafine zinc oxide particle dispersion. The aqueous dispersion of the water-dispersible isocyanate compound is added to the obtained dispersion and stirred. As necessary, an organic solvent such as isopropyl alcohol is added and stirred. The coating liquid (a) is obtained as a result.

Action and Effects

Since the coating liquid (a) according to the present embodiment includes ultrafine zinc oxide particles, a polyester resin having an acid value of 15 mg KOH/g or less, an ammonium polycarboxylate salt and water, the dispersion stability of the ultrafine zinc oxide particles is good.

In addition, the layer (A) formed from the coating liquid (a) according to the present embodiment is combined with the layer (B) containing a polycarboxylate polymer to form a gas barrier layer. The gas barrier laminate having such a gas barrier layer has excellent hot water resistance and exhibits excellent gas barrier properties even after hot water treatments such as retort treatments and boiling treatments.

In the coating liquid (a) according to the present embodiment, the ammonium polycarboxylate salt functions as a dispersing agent for the ultrafine zinc oxide particles. The ammonium polycarboxylate salt has a high adsorption ability with respect to the surface of the ultrafine zinc oxide particles and an electric repulsive force tends to occur due to ionization after adsorption to the surface of the ultrafine zinc oxide particles. Therefore, the ammonium polycarboxylate salt contributes to suitable dispersion of the ultrafine zinc oxide particles.

The ammonium polycarboxylate salt has similar physical and chemical properties to the polycarboxylate polymer included in the layer (B). Therefore, even in a case where the layer (A) and the layer (B) are formed adjacent to each other, a defect in transparency due to reactions between the layers does not occur, and it is possible to obtain a gas barrier laminate excellent in transparency.

Gas Barrier Laminate

A description will be given below of gas barrier laminates according to the second to fifth embodiments of the present invention using the accompanying drawings to illustrate embodiments.

Second Embodiment

FIG. 1 is a cross-sectional view schematically showing a gas barrier laminate according to a second embodiment of the present invention.

A gas barrier laminate 10 according to the present embodiment includes a base material 1 and a gas barrier layer 2 laminated on one surface (first surface) of the base material 1.

The gas barrier layer 2 has a first layer 3 and a second layer 4 laminated in order from the base material 1 side.

The first layer 3 is the layer (B) including a polycarboxylate polymer. The second layer 4 is the layer (A) formed from the coating liquid (a) according to the first embodiment of the present invention.

Base Material

Examples of the material of the base material 1 include plastics, paper, rubber, and the like. Among these materials, plastics are preferable from the viewpoint of adhesion between the base material 1 and the gas barrier layer 2.

Examples of plastics include polyolefin polymers such as low-density polyethylene, high density polyethylene, linear low-density polyethylene, polypropylene, poly 4-methyl pentene, cyclic polyolefins, and copolymers and acid modified polymers thereof; vinyl acetate copolymers such as polyvinyl acetate, ethylene-vinyl acetate copolymer, saponified ethylene-vinyl acetate copolymer and polyvinyl alcohol; polyester polymers such as polyethylene terephthalate, polybutylene terephthalate, polyethylene naphthalate, poly ε-caprolactone, polyhydroxybutyrate, polyhydroxyvalerate, and copolymers thereof; polyamide polymers such as nylon 6, nylon 66, nylon 12, nylon 6,66 copolymers, nylon 6,12 copolymers, metaxylene adipamide-nylon 6 copolymers, and copolymers thereof; polyether polymers such as polyethylene glycol, polyether sulfone, polyphenylene sulfide, and polyphenylene oxide; chlorine type or fluorine type polymers such as polyvinyl chloride, polyvinylidene chloride, polyvinyl fluoride, polyvinylidene fluoride, and copolymers thereof; acrylic polymers such as polymethyl acrylate, polyethyl acrylate, polymethyl methacrylate, polyethyl methacrylate, polyacrylonitrile, and copolymers thereof; polyimide polymers and copolymers thereof; resins such as alkyd resins, melamine resins, acrylic resins, nitrocellulose, polyurethane resins, unsaturated polyester resins, phenolic resins, amino resins, fluororesins, and epoxy resins for paints; natural polymer compounds such as cellulose, starch, pullulan, chitin, chitosan, glucomannan, agarose, gelatin, mixtures thereof, and the like.

A surface activation treatment such as a corona treatment, a flame treatment, or a plasma treatment may be applied to the surface of the base material 1 from the viewpoint of adhesion to the gas barrier layer 2.

The form of the base material 1 is not limited to a sheet (a film or a plate) as shown in the figure, but may be in a form such as a bottle, a cup, a tray, a tank, a tube, or the like. The form of the base material 1 is preferably a sheet.

The thickness of the base material 1 varies depending on the use thereof and the like, but is usually 5 μm to 2 cm. In a case where the form of the base material 1 is a sheet, the thickness is preferably 5 μm to 800 μm, and more preferably 10 μm to 500 μm. In the case of bottles, cups, trays, tanks and the like, the thickness is preferably 100 μm to 1 cm, and more preferably 150 μm to 8 mm. In the case of a tube shape, the thickness is preferably 20 μm to 2 cm. When the thickness of the base material 1 is within the above range, the workability and productivity are excellent.

Layer (A) (Second Layer)

The layer (A) is a layer formed from the coating liquid (a) according to the first embodiment of the present invention, and includes ultrafine zinc oxide particles, a polyester resin having an acid value of 15 mg KOH/g or less, an ammonium polycarboxylate salt. In a case where the coating liquid (a) includes a water-dispersible isocyanate compound or other components, the layer (A) also includes a water-dispersible isocyanate compound and other components.

From the viewpoint of the gas barrier property of the gas barrier laminate, the amount of the ultrafine inorganic compound particles in the layer (A) is preferably 20 to 90 mass % with respect to the total mass (100 mass %) of the layer (A), and more preferably 50 to 90 mass %.

Here, the layer (A) is a layer formed from the coating liquid (a). Therefore, the amount of the ultrafine zinc oxide particles with respect to the total mass of the layer (A) is usually equal to the amount of the ultrafine zinc oxide particles with respect to the solid content of the coating liquid (a). The same also applies to the amounts of each of the polyester resin, the ammonium polycarboxylate salt, the water-dispersible isocyanate compound, and other components.

The mass per unit area of the layer (A) is preferably 0.1 to 10 g/m$^2$, more preferably 0.1 to 6 g/m2, and even more preferably 0.1 to 2 g/m$^2$. When the mass per unit area of the layer (A) is the above lower limit (0.1 g/m$^2$) or more, the gas barrier property is superior. In addition, when the mass per unit area is the upper limit (10 g/m$^2$) described above or less, the appearance of the gas barrier laminate is good.

The thickness of the layer (A) is preferably 0.05 μm to 5 μm, more preferably 0.1 μm to 3 μm, and even more preferably 0.1 μm to 1 μm. When the thickness of the layer (A) is the lower limit (0.05 μm) or more, the gas barrier property is superior, and when the thickness is the upper limit (5 μm) or less, the appearance of the gas barrier laminate is good.

Layer (B) (First Layer)

The layer (B) is a layer including a polycarboxylate polymer.

From the viewpoint of the gas barrier property and water resistance, the layer (B) preferably further includes at least one kind of silicon-containing compound (i) selected from the group consisting of a silane coupling agent, a hydrolyzate thereof, and condensates thereof.

The layer (B) may further contain other components than the polycarboxylate polymer and the silicon-containing compound (i), as necessary.

Polycarboxylate Polymer

The polycarboxylate polymer is a polymer having two or more carboxyl groups in the molecule. Examples of polycarboxylate polymers include (co)polymers of ethylenically unsaturated carboxylic acids; copolymers of ethylenically unsaturated carboxylic acids and other ethylenically unsaturated monomers; acidic polysaccharides having a carboxyl group in the molecule such as alginic acid, carboxymethyl cellulose, and pectin.

As the polycarboxylate polymer, one kind may be used alone, or two or more kinds may be used in a mixture.

Examples of ethylenically unsaturated carboxylic acids include acrylic acid, methacrylic acid, itaconic acid, maleic acid, fumaric acid, crotonic acid, and the like.

Examples of ethylenically unsaturated monomers copolymerizable with the ethylenically unsaturated carboxylic acid include saturated carboxylic acid vinyl esters such as ethylene, propylene, and vinyl acetate, alkyl acrylates, alkyl methacrylates, alkyl itaconate, vinyl chloride, vinylidene chloride, styrene, acrylamide, acrylonitrile, and the like.

From the viewpoint of the gas barrier properties of the gas barrier laminate, as the polycarboxylate polymer, a polymer including a constituent unit derived from at least one kind of a polymerizable monomer selected from the group consisting of acrylic acid, maleic acid, methacrylic acid, itaconic acid, fumaric acid, and crotonic acid, or a mixture of two kinds or more of the above polymers, is preferable. In addition, as the polycarboxylate polymer, a polymer including a constituent unit derived from at least one kind of polymerizable monomer selected from the group consisting of acrylic acid, maleic acid, methacrylic acid, and itaconic acid, or a mixture of two or more kinds of the polymers, is particularly preferable.

Here, the polymer may be a homopolymer or a copolymer. In the polymer, the amount of the constituent unit derived from at least one kind of polymerizable monomer selected from the group consisting of acrylic acid, maleic acid, methacrylic acid, and itaconic acid is preferably 80 mol % or more with respect to the total of the constituent units forming the polymer, and more preferably 90 mol % or more. In addition, the amount may be 100 mol %.

Here, in a case where constituent units other than the above constituent units are included, examples of other constituent units include constituent units derived from ethylenically unsaturated monomers copolymerizable with the ethylenically unsaturated carboxylic acid described above, and the like.

The number average molecular weight of the polycarboxylate polymer is preferably 2,000 to 10,000,000, and more preferably 5,000 to 1,000,000. When the number average molecular weight is less than 2,000, it is not possible for the obtained gas barrier laminate to attain sufficient hot water resistance. Therefore, there is a concern that the gas barrier property and the transparency will deteriorate or whitening will occur due to hot water. On the other hand, if the number average molecular weight exceeds 10,000,000, when the layer (B) is formed by the coating of the coating liquid (b) including the polycarboxylate polymer, there is a concern that the viscosity of the coating liquid (b) will be high and that the coating property will be impaired.

The number average molecular weight is a number average molecular weight in terms of polystyrene determined by gel permeation chromatography (GPC).

In the polycarboxylate polymer in the layer (B), part of the carboxyl groups may be neutralized with a basic compound. As the basic compound, at least one kind selected from the group consisting of a polyvalent metal compound, a monovalent metal compound, and ammonia is preferable.

When a part of the carboxyl groups of the polycarboxylate polymer is neutralized, it is possible to further improve the hot water resistance at the time of manufacturing the gas barrier laminate.

The degree of neutralization of the carboxyl group is preferably 30 mol % or less, and more preferably 25 mol % or less from the viewpoint of the coating property of the coating liquid (b) described below and the coating liquid stability.

Silicon-Containing Compound (i)

The silicon-containing compound (i) is at least one kind selected from the group consisting of a silane coupling agent, a hydrolyzate thereof, and a condensate thereof.

In the present embodiment, a condensate of a hydrolyzate of a silane coupling agent is also referred to as a hydrolysis condensate.

Specific examples of silane coupling agents include tetramethoxysilane, tetraethoxysilane, γ-glycidoxypropyltrimethoxysilane, γ-glycidoxypropyltriethoxysilane, γ-aminopropyltrimethoxysilane, and γ-aminopropyltriethoxysilane, and γ-glycidoxypropyltrimethoxysilane and γ-aminopropyltrimethoxysilane are preferable. One silane coupling agent may be used alone or a combination of two or more kinds may be used.

In a case where a tetraalkoxysilane such as tetramethoxysilane or tetraethoxysilane is used as the silane coupling agent, when γ-glycidoxypropyltrimethoxysilane, γ-glycidoxypropyltriethoxysilane, γ-aminopropyltrimethoxysilane, γ-aminopropyltriethoxysilane, or the like is combined therewith, the water resistance is excellent, which is preferable.

The silicon-containing compound (i) may be a silane coupling agent itself, a hydrolyzate obtained by hydrolyzing a silane coupling agent, or a condensate thereof.

As the silicon-containing compound (i), for example, it is possible to use a hydrolysis condensate obtained by carrying out hydrolyzing and a condensation reaction on the silane coupling agent using a sol-gel method.

Usually, since the silane coupling agent easily undergoes hydrolysis, and a condensation reaction easily occurs in the presence of an acid or an alkali, it is rare that only the silane coupling agent, only the hydrolyzate thereof, or only the condensate thereof is present. That is, in many cases, the silicon-containing compound (i) is also present in a mixture with a silane coupling agent, a hydrolyzate thereof, and a condensate thereof. In addition, the hydrolyzate often includes a partial hydrolyzate and a complete hydrolyzate.

The silicon-containing compound (i) preferably includes at least a hydrolysis condensate.

The hydrolyzate is formed by replacing at least a part of the alkoxy group (OR) of the silane coupling agent with a hydroxyl group. Furthermore, the condensation of the hydrolyzate forms a compound in which a silicon atom (Si) is bonded via oxygen. By repeating this condensation, a hydrolysis condensate is obtained.

In a case where the silicon-containing compound (i) is included in the layer (B), the amount of the silicon-containing compound (i) is preferably such that the ratio of the mass of the polycarboxylate polymer to the mass of the silicon-containing compound (i) (polycarboxylate polymer:silicon-containing compound (i)) is 99.5:0.5 to 80.0:20.0.

However, the mass of the silicon-containing compound (i) other than the silane coupling agent is the mass in terms of the silane coupling agent. That is, the silicon-containing compound (i) usually contains a mix of a silane coupling agent, a hydrolyzate thereof, and a condensate thereof. Therefore, the mass of the silicon-containing compound (i) is the value converted into the silane coupling agent, that is, the charged amount of the silane coupling agent.

When the amount of the silicon-containing compound (i) is within the above range, the adhesion between the base material and the layer (B) (the first layer 3) is excellent, and when the gas barrier laminate is exposed to cold water, the gas barrier laminate does not whiten and is excellent in water resistance.

Other Components

The components other than the polycarboxylate polymer and the silicon-containing compound (i) are not particularly limited, and various kinds of additives may be included.

Examples of additives include plasticizers, resins, dispersing agents, surfactants, softeners, stabilizers, anti-blocking agents, film forming agents, adhesives, oxygen absorbers, and the like.

For example, in a case where a plasticizer is included in the layer (B), the stretchability of the layer (B) is improved. Therefore, it is possible to improve the damage resistance of the gas barrier laminate.

As the plasticizer, it is possible to appropriately select and use known plasticizers. Specific examples of plasticizers include ethylene glycol, trimethylene glycol, propylene glycol, tetramethylene glycol, 1,3-butanediol, 2,3-butanediol, pentamethylene glycol, hexamethylene glycol, diethylene glycol, triethylene glycol, polyethylene glycol, polyvinyl alcohol, ethylene-vinyl alcohol copolymer, polyethylene oxide, sorbitol, mannitol, dulcitol, erythritol, glycerin, lactic acid, fatty acid, starch, phthalate ester, and the like. The above may be used as a mixture, as necessary.

Among these, from the viewpoint of stretchability and the gas barrier property, polyethylene glycol, polyvinyl alcohol, ethylene-vinyl alcohol copolymer, glycerin, and starch are preferable.

Here, in a case where the layer (B) includes a compound having two or more hydroxyl groups, such as polyvinyl alcohol, as an additive, the hydroxyl group and a part of the carboxyl group of the polycarboxylate polymer may form an ester bond.

In a case where the layer (B) includes an additive, the ratio of the mass of the polycarboxylate polymer to the mass of the additive (polycarboxylate polymer:additive) is preferably 70:30 to 99.9:0.1, and more preferably 80:20 to 98:2.

The mass per unit area of the layer (B) is preferably 0.1 to 10 g/m$^2$, more preferably 0.1 to 6 g/m$^2$, and even more preferably 0.1 to 2 g/m$^2$. When the mass per unit area of the layer (B) is within the above range, the gas barrier property is superior.

The thickness of the layer (B) is preferably 0.05 µm to 5 µm, more preferably 0.1 µm to 3 µm, and even more preferably 0.1 µm to 1 µm. When the thickness of the layer (B) is within the above range, the gas barrier property is superior.

Gas Barrier Layer

In the gas barrier layer 2, from the viewpoint of the gas barrier property of the gas barrier laminate 10, the mass per unit area of the layer (A) is preferably ⅓ or more the mass per unit area of the layer (B) and more preferably ½ or more. When the mass per unit area of the layer (A) is the lower limit described above or more, the gas barrier property of the gas barrier laminate 10 is superior.

In addition, in the gas barrier layer 2, the mass per unit area of the layer (A) is preferably 10 times or less the mass per unit area of the layer (B). When the mass per unit area of the layer (A) is the upper limit described above or less, the peel strength between the layers of the gas barrier laminate 10 is excellent. In addition, it is also preferable due to being excellent in terms of the cost when manufacturing the gas barrier laminate 10.

In a case where a plurality of layers (A) and (B) are present in the gas barrier layer, the mass per unit area of the layer (A) and the mass per unit area of the layer (B) are the total mass per unit area of each layer.

Method for Manufacturing Gas Barrier Laminate

The gas barrier laminate 10 may be produced by a manufacturing method including, for example, the following steps (α1) and (α2).

(α1): Step of forming the first layer 3 (layer (B)) on one surface of the base material 1.

(α2): Step of coating and drying a coating liquid (a) on a surface of the first layer 3 opposite to the base material 1, the first layer 3 being formed on the base material 1, to form the second layer 4 (layer (A)).

Step (α1)

The method for forming the layer (B) is not particularly limited, but, for example, the layer (B) is formed by coating and drying a coating liquid (b) including a polycarboxylate polymer and a solvent on the base material 1.

The coating liquid (b) may further include a silicon-containing compound (i) and other components, as necessary.

The solvent to be used for the coating liquid (b) agent is not particularly limited except that water for carrying out the hydrolysis reaction is usually necessary in a case where a silane coupling agent is contained, and it is possible to use water, an organic solvent, a mixed solvent of water and an organic solvent, or the like.

The organic solvent is preferably at least one kind selected from the group consisting of a lower alcohol having 1 to 5 carbon atoms and a lower ketone having 3 to 5 carbon atoms.

Specific examples of organic solvents include methanol, ethanol, propanol, isopropanol, n-butanol, isobutanol, sec-butanol, tert-butanol, acetone, methyl ethyl ketone, and the like.

As a mixed solvent of water and an organic solvent, a mixed solvent using the organic solvent described above is preferable, and a mixed solvent of water and a lower alcohol having 1 to 5 carbon atoms is more preferable.

In the mixed solvent, it is preferable that water is present in an amount of 20 to 95 mass % and the organic solvent is present in an amount of 80 to 5 mass % (however, the total amount of water and the organic solvent is 100 mass %).

As a solvent, water is preferable in terms of the solubility of the polycarboxylate polymer and the cost. From the viewpoints of the solubility of the silane coupling agent and the coating property of the coating liquid (b), alcohol is preferably included.

In a case where the silicon-containing compound (i) is included in the coating liquid (b), the ratio of the mass of the polycarboxylate polymer to the mass of the silicon-containing compound (i) (the polycarboxylate polymer:silicon-containing compound (i)) is preferably 99.5:0.5 to 80.0:20.0 from the viewpoint of gas barrier properties of the gas barrier laminate.

However, the mass of the silicon-containing compound (i) other than the silane coupling agent is the mass in terms of the silane coupling agent. That is, the silicon-containing compound (i) usually contains a mix of a silane coupling agent, a hydrolyzate thereof, and a condensate thereof. Therefore, the mass of the silicon-containing compound (i) is the value converted into the silane coupling agent, that is, the charged amount of the silane coupling agent.

When the silicon-containing compound (i) is within the above range, it is possible to obtain a gas barrier laminate which does not whiten when exposed to cold water and which is excellent in water resistance.

In the coating liquid (b), from the viewpoints of the gas barrier properties and coating property, the total amount (solid content) of the polycarboxylate polymer and preferably included silicon-containing compound (i) and the other components included as necessary, in the coating liquid (b) is preferably 0.5 to 50 mass % with respect to the total mass of the coating liquid (b), and more preferably 0.8 to 30 mass %, and particularly preferably 1.0 to 20 mass %.

It is possible to prepare the coating liquid (b) by mixing each component. In a case where the coating liquid (b) includes the silicon-containing compound (i) and the silicon-containing compound (i) includes a hydrolysis condensate, the silane coupling agent may be directly mixed with a solution containing the polycarboxylate polymer and water to prepare the coating liquid (b). In addition, water may be added to the silane coupling agent to carry out hydrolysis and a subsequent condensation reaction, and the obtained hydrolysis condensate may be mixed with a polycarboxylate polymer to prepare a coating liquid (b).

The coating method of the coating liquid (b) is not particularly limited, and examples thereof include casting methods, dipping methods, roll coating methods, gravure coating methods, screen printing methods, reverse coating methods, spray coating methods, kit coating methods, die coating methods, metering bar coating methods, chamber doctor combination coating methods, curtain coating methods, and the like.

After coating the coating liquid (b) onto the base material 1, the solvent of the coating liquid (b) is removed by drying the solvent to form the first layer 3 (layer (B)) on the base material 1.

The method of drying the solvent is not particularly limited, and examples thereof include methods such as hot air-drying methods, hot roll contact methods, infrared heating methods, and microwave heating methods. The methods may be performed alone or in combination. The drying temperature is not particularly limited, but in a case of using the water described above or a mixed solvent of water and an organic solvent as the solvent, the drying temperature is usually preferably 50° C. to 160° C. In addition, regarding the pressure at the time of drying, the method is usually preferably carried out under normal pressure or reduced pressure, and preferably carried out at normal pressure from the viewpoint of simplicity of the facility.

In a case where the silicon-containing compound (i) is included in the coating liquid (b), a heating treatment may be performed at the time when the drying is completed (or nearly completed) or at the time when an aging treatment described below is completed in order to increase the ratio of the condensate in the silicon-containing compound (i) included in the layer (B).

The heating treatment is usually carried out at a temperature of 120° C. to 240° C., and preferably 150° C. to 230° C., usually for 10 seconds to 30 minutes, and preferably 20 seconds to 20 minutes.

Here, although the drying and the heating treatment have portions where the conditions such as temperature overlap, these treatments do not need to be distinguished clearly and may be carried out continuously.

Step ((α2)

The coating method of the coating liquid (a) is not particularly limited, and examples thereof include casting methods, dipping methods, roll coating methods, gravure coating methods, screen printing methods, reverse coating methods, spray coating methods, kit coating methods, die coating methods, metering bar coating methods, chamber doctor combination coating methods, curtain coating methods, and the like.

After coating the coating liquid (a) onto the first layer 3, the solvent of the coating liquid (a) is removed by drying the solvent to form the second layer 4 (layer (A)) on the first layer 3.

The method of drying is not particularly limited, and examples thereof include methods such as hot air drying methods, hot roll contact methods, infrared heating methods, and microwave heating methods. The methods may be performed alone or in combination. The drying temperature is not particularly limited, but in a case of using the water described above or a mixed solvent of water and an organic solvent as a solvent, the drying temperature is usually preferably 50° C. to 160° C. In addition, regarding the pressure at the time of drying, the method is usually preferably carried out under normal pressure or reduced pressure, and preferably carried out at normal pressure from the viewpoint of simplicity of the facility.

Action and Effects

The gas barrier laminate 10 of the present embodiment has the gas barrier layer 2 having the second layer 4 which is the layer (A) formed from the coating liquid (a) according to the first embodiment of the present invention, and the first layer 3 which is the layer (B) containing a polycarboxylate polymer. Therefore, the gas barrier laminate 10 is excellent in hot water resistance and exhibits excellent gas barrier properties even after hot water treatments such as retort treatments and boiling treatments.

Specifically, the oxygen permeability of the gas barrier laminate 10 is preferably 200 $cm^3/(m^2 \cdot day \cdot MPa)$ or less, more preferably 100 $cm^3/(m^2 \cdot day \cdot MPa)$ or less, even more preferably 80 $cm^3/(m^2 \cdot day \cdot MPa)$ or less, and particularly preferably 50 $cm^3/(m^2 \cdot day \cdot MPa)$ or less. The lower the oxygen permeability is, the better, and, although not particularly limited, the lower limit is usually 0.1 $cm^3/(m^2 \cdot day \cdot MPa)$ or more.

The oxygen permeability is a value measured under conditions of a temperature of 30° C., a sample area of 50 $cm^2$, and a 70% relative humidity (RH) on both sides in accordance with the method described in JIS K-7126 B method (isostatic method) and ASTM D 3985.

In addition, the transparency is also excellent in terms of the fact that the dispersing agent of the ultrafine zinc oxide particles is an ammonium polycarboxylate salt, that the ultrafine zinc oxide particles are well dispersed in the second layer 4, that the binder of the ultrafine zinc oxide particles is a polyester resin, and the like.

Specifically, the haze of the gas barrier laminate 10 is preferably 10% or less, and more preferably 7% or less. The lower limit of the haze is not particularly limited, but is usually 2% or more.

The haze is a value measured with a haze meter (Haze Meter NDH 2000, manufactured by Nippon Denshoku Industries Co., Ltd.).

Furthermore, the gas barrier laminate 10 is also excellent in adhesion between layers.

Specifically, the peel strength of the gas barrier laminate 10 is preferably 2.0 N/15 mm or more, more preferably 3.0 N/15 mm or more, and particularly preferably, the gas barrier laminate 10 is not peelable.

The peel strength was the peel strength when measurement was performed by T-type peeling using the tensile tester (TENSILON RC-1210A, manufactured by Orientec Co., Ltd.) in accordance with JIS K-6854-3 at a rate of 200 mm/min with the width of the sample set as 15 mm.

It is possible to use the gas barrier laminate 10, for example, as a packaging material for foods, beverages, pharmaceuticals, precision metal parts such as electronic parts and among these, it is possible to suitably use the gas barrier laminate as a packaging material for foods.

In a case such as where the gas barrier laminate 10 is used as a packaging material for foods or the like, in order to sterilize contents such as foods, a hot water treatment such as a retort treatment or a boiling treatment may be performed after filling the contents therein.

The gas barrier laminate 10 after the retort treatment or the boiling treatment was performed not only has excellent transparency, but also has a tendency for the gas barrier property to be improved as compared with before the hot water treatments such as the retort treatment and the boiling treatment. Therefore, the gas barrier laminate 10 is particularly suitable as a packaging material in a field requiring heat sterilization after packaging such as foods.

The oxygen permeability of the gas barrier laminate 10 after a hot water treatment such as a retort treatment or a boiling treatment is performed is preferably 100 cm$^3$/(m$^2$·day·MPa) or less, more preferably 50 cm$^3$/(m$^2$·day·MPa) or less, even more preferably 20 cm$^3$/(m$^2$·day·MPa) or less, and particularly preferably 10 cm$^3$/(m$^2$·day·MPa) or less. The lower the oxygen permeability is, the better, and, although not particularly limited, the lower limit is usually 0.1 cm$^3$/(m$^2$·day·MPa) or more.

The oxygen permeability is a value measured under the conditions of a temperature of 30° C., a sample area of 50 cm$^2$, and a 70% relative humidity (RH) on both sides in accordance with the method described in JIS K-7126 B method (isostatic method) and ASTM D 3985.

A description of the conditions of the retort treatment and the boiling treatment will be given below, but it is possible to appropriately change the above conditions according to the contents.

A retort treatment is a method of pressurizing and sterilizing microorganisms such as mold, yeast, bacteria, and the like, generally for preserving foods and the like. Normally, the gas barrier laminate in which the food is packaged is subjected to a pressurizing and sterilizing treatment under pressure at 105° C. to 140° C. and 0.15 to 0.3 MPa for 10 to 120 minutes. Retort apparatuses include steam type apparatuses utilizing heated steam, hot water type apparatuses utilizing pressurized superheated water, and the like, and are appropriately chosen and used depending on the sterilization conditions of the food or the like to be contained.

A boiling treatment is a method of sterilizing with moist heat to preserve foods and the like. Although it depends on the content, the sterilization treatment is normally performed on the gas barrier laminate in which the food or the like is packaged at 60° C. to 100° C. under atmospheric pressure for 10 to 120 minutes. The boiling treatment is usually carried out using a hot water bath, but there are a batch type treatment in which immersion in a hot water bath is carried out at a constant temperature and the content is taken out after a certain period of time, and a continuous type treatment in which sterilization is carried out by tunneling through a hot water bath.

Third Embodiment

Figure 2:
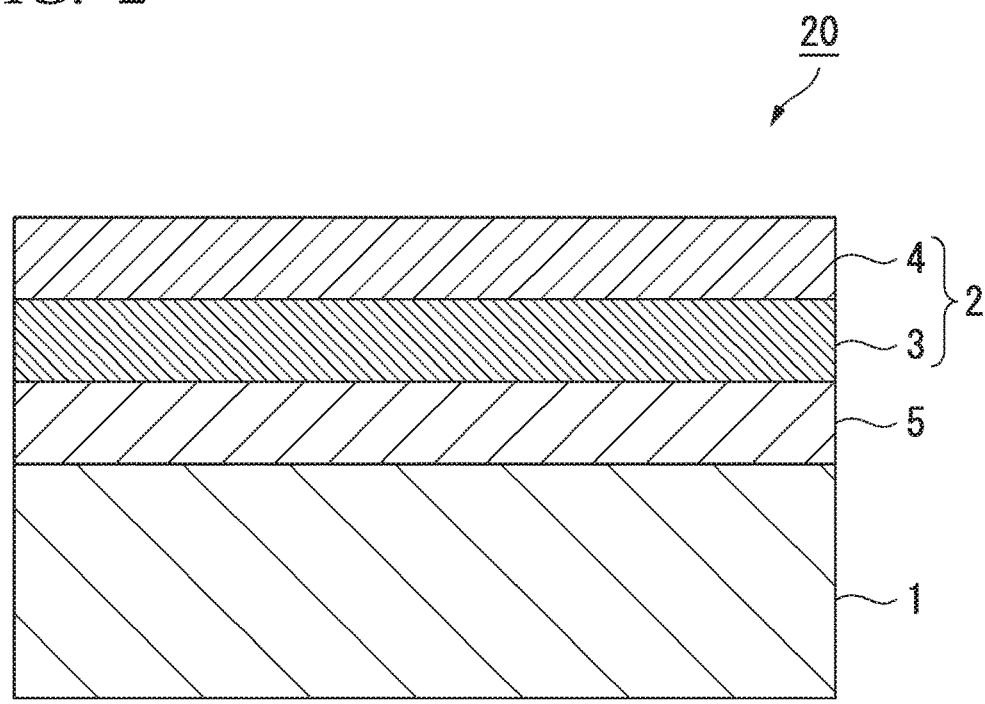
FIG. 2 is a cross-sectional view schematically showing a gas barrier laminate according to a third embodiment of the present invention.

FIG. 2 is a cross-sectional view schematically showing a gas barrier laminate according to a third embodiment of the present invention. In the embodiments described below, the same reference numerals are given to the constituent elements corresponding to the second embodiment, and a detailed description thereof will be omitted.

The gas barrier laminate 20 of the present embodiment includes the base material 1, an anchor coat layer 5, and the gas barrier layer 2. The anchor coat layer 5 is laminated on one surface (first surface) of the base material 1. The gas barrier layer 2 is laminated on the anchor coat layer 5. The gas barrier layer 2 has the first layer 3 and the second layer 4 laminated in order from the side of the base material 1.

The gas barrier laminate 20 is the same as the gas barrier laminate 10 of the second embodiment except that the anchor coat layer 5 is further provided between the base material 1 and the gas barrier layer 2.

Anchor Coat Layer

The anchor coat layer 5 is provided to improve the adhesion between the base material 1 and the gas barrier layer 2.

As a material forming the anchor coat layer 5, for example, it is possible to use a resin such as alkyd resins, melamine resins, acrylic resins, nitrocellulose, polyurethane resins, polyester resins, phenol resins, amino resins, fluororesins, epoxy resins, and carbodiimide group-containing resins. Among these, polyurethane resins, polyester resins, acrylic resins, epoxy resins, and carbodiimide group-containing resins are preferable. One kind of these resins may be used alone or a combination of two or more kinds thereof may be used.

As the resin, a polyurethane resin is particularly preferable.

The polyol forming the polyurethane resin is preferably a polyester polyol. Examples of polyester polyols include a polyester polyol obtained by reacting a polycarboxylic acid or the like with a glycol.

Examples of the polyisocyanate forming the polyurethane resin include 2,4-tolylene diisocyanate, 2,6-tolylene diisocyanate, m-phenylene diisocyanate, p-phenylene diisocyanate, 4,4'-diphenylmethane diisocyanate, hexamethylene diisocyanate, xylylene isocyanate, and isophorone diisocyanate.

The anchor coat layer 5 may include a carbodiimide group-containing resin from the viewpoint of adhesion to the first layer 3 (layer (B)).

As necessary, additives such as a curing agent and a silane coupling agent may be added to the resin. Examples of silane coupling agents include the same examples as described above.

From the viewpoints of adhesion and appearance, the thickness of the anchor coat layer 5 is preferably 0.01 μm to 1 μm, and more preferably 0.05 μm to 1 μm.

The mass per unit area of the anchor coat layer 5 is preferably 0.01 to 1 g/m$^2$, and more preferably 0.05 to 1 g/m$^2$.

Method for Manufacturing Gas Barrier Laminate

It is possible for the gas barrier laminate 20 to be manufactured by a manufacturing method including, for example, the following steps (β1), (β2), and (β3).

(β1): a step of forming the anchor coat layer 5 on one surface of the base material 1.

(β2): a step of forming the first layer 3 on the surface of the anchor coat layer 5 opposite to the base material 1, the anchor coat layer 5 being formed on the base material 1.

(β3): a step of forming the second layer 4 on the surface of the first layer 3 opposite to the anchor coat layer 5, the first layer 3 being formed on the base material 1 and the anchor coat layer 5.

Step (β1)

The method for forming the anchor coat layer 5 is not particularly limited, and it is possible to appropriately select a known method. For example, it is possible to form the anchor coat layer 5 by coating and drying an anchor coating agent.

The anchor coating agent used for forming the anchor coat layer 5 includes anchor coating agents including the resins described above or precursors thereof, solvents, and, as necessary, additives. Polyurethane, polyester, or acrylic polymer materials are preferable as the resin or the precursor thereof. Among these, a two-liquid type anchor coating agent having a main agent containing a polyester polyol which is a polyurethane polymer material and a curing agent containing an isocyanate is preferable.

Step (β2)

It is possible to carry out step (β2) in the same manner as step ((α1) in the second embodiment.

Step (β3)

It is possible to carry out step (β3) in the same manner as step ((α2) in the second embodiment.

An aging treatment may be carried out after coating and drying an anchor coating agent on the base material 1 in step (β1), after coating and drying the coating liquid (b) in step (β2) to form the layer (B), or after coating and drying the coating liquid (a) in step (β3) to form the layer (A). Examples of aging treatments include treatments which are usually carried out at temperature conditions of 30° C. to 200° C. and preferably 30° C. to 150° C., and which are maintained for 0.5 to 10 days and preferably 1 to 7 days.

Action and Effect

The gas barrier laminate 20 has the gas barrier layer 2 having the second layer 4 which is the layer (A) formed from the coating liquid (a) according to the first embodiment of the present invention and the first layer 3 which is the layer (B) containing the polycarboxylate polymer. Therefore, in the same manner as the second embodiment, the hot water resistance is excellent and the transparency and adhesion between layers are also excellent. In addition, providing the anchor coat layer 5 makes the adhesion between the base material 1 and the gas barrier layer 2 superior.

In the same manner as the gas barrier laminate 10 of the second embodiment, it is possible to use the gas barrier laminate 20 as a packaging material for foods, beverages, pharmaceuticals, and precision metal parts such as electronic parts, and the same applies to preferable embodiments.

Fourth Embodiment

Figure 3:
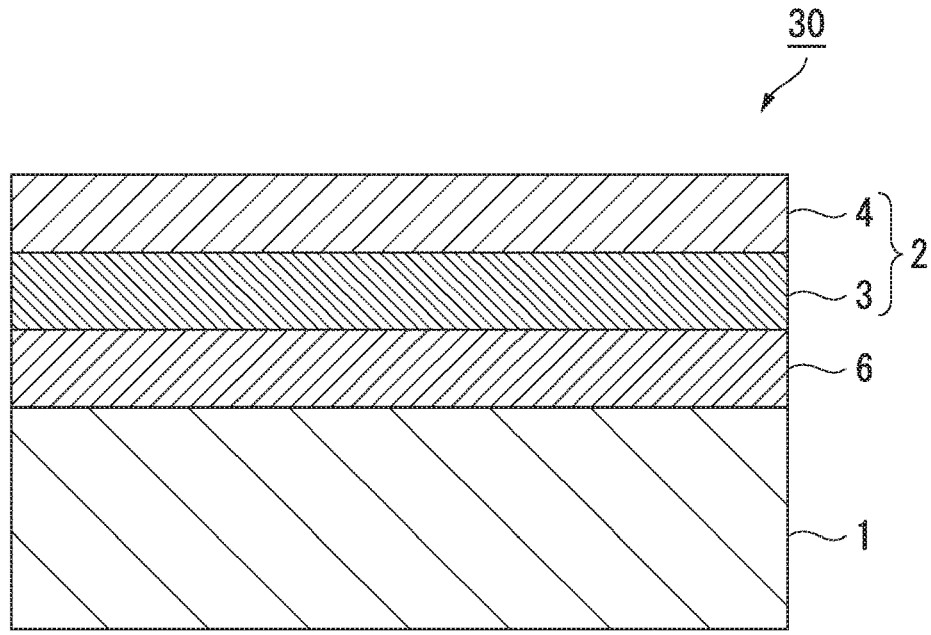
FIG. 3 is a cross-sectional view schematically showing a gas barrier laminate according to a fourth embodiment of the present invention.

FIG. 3 is a cross-sectional view schematically showing a gas barrier laminate of a fourth embodiment of the present invention.

The gas barrier laminate 30 of the present embodiment includes the base material 1, an inorganic deposition layer 6, and the gas barrier layer 2. The inorganic deposition layer 6 is laminated on one surface (first surface) of the base material 1. The gas barrier layer 2 is laminated on the inorganic deposition layer 6. The gas barrier layer 2 is formed by laminating the first layer 3 and the second layer 4 in this order from the side of the base material 1.

The gas barrier laminate 30 is the same as the gas barrier laminate 10 of the second embodiment except that the inorganic deposition layer 6 is further provided between the base material 1 and the gas barrier layer 2.

Inorganic Deposition Layer

The inorganic deposition layer 6 is a layer formed by a deposition method and formed of an inorganic material.

The inorganic deposition layer 6 is provided to improve the gas barrier properties such as an oxygen barrier property and a water vapor barrier property of the gas barrier laminate 30, particularly the water vapor barrier property.

As the inorganic material forming the inorganic deposition layer 6, an inorganic material capable of forming an inorganic deposition layer for imparting gas barrier properties such as an oxygen barrier property and a water barrier property is appropriately selected.

Examples of inorganic materials include aluminum, aluminum oxide, magnesium oxide, silicon oxide, tin oxide, and the like. The inorganic materials are used alone or in a combination of two or more, as necessary.

As an inorganic material, at least one selected from the group consisting of aluminum, aluminum oxide, magnesium oxide, and silicon oxide is preferable from the viewpoint of high gas barrier properties.

In aluminum oxide, the presence ratio of aluminum (Al) to oxygen (O) is preferably a molar ratio of Al:O=1:1.5 to 1:2.0. For example, it is possible to form the aluminum oxide deposition layer by reactive vapor deposition, reactive sputtering, reactive ion plating or the like in which a thin film is formed in the presence of a mixed gas such as oxygen, carbon dioxide gas, or an inert gas using aluminum as the deposition material. At this time, if aluminum is reacted with oxygen, since the aluminum is stoichiometrically $Al_2O_3$, the presence ratio of aluminum (Al) and oxygen (O) should be a molar ratio of Al:O=1:1.5. However, depending on the deposition method, a portion of aluminum may be present or aluminum peroxide may be present. Therefore, when the ratio of elements in the aluminum oxide vapor deposition layer is measured using an X-ray photoelectron spectroscopic analyzer (XPS) or the like, generally, it is understood that it is not possible to say that the presence ratio of aluminum (Al) and oxygen (O) is a molar ratio of Al:O=1:1.5. In general, in a case where the presence ratio of aluminum (Al) and oxygen (O) is a molar ratio in which the amount of oxygen is smaller than Al:O=1:1.5 and the amount of aluminum is large, since the aluminum oxide vapor deposition layer becomes dense, it is possible to obtain good gas barrier properties. Meanwhile, the aluminum oxide deposition layer tends to be colored black, and the amount of transmitted light tends to be low. On the other hand, in a case where the presence ratio of aluminum (Al) and oxygen (O) is a molar ratio in which the amount of oxygen is larger than Al:O=1:1.5 and the amount of aluminum is small, the aluminum oxide vapor deposition layer becomes sparse, thus the gas barrier property is bad. On the other hand, the amount of transmitted light is high and the layer is transparent.

Silicon oxide is preferably used particularly in a case where the inorganic deposition layer 6 is required to have water resistance.

The thickness of the inorganic deposition layer 6 varies depending on the use of the gas barrier laminate 30 and the thickness of the gas barrier layer 2, but is preferably 5 to 300 nm, and more preferably 10 to 50 nm. When the thickness of the inorganic deposition layer 6 is the lower limit (5 nm) of the above range or more, the continuity of the inorganic deposition layer 6 is good and the gas barrier property is excellent. When the thickness of the inorganic deposition layer 6 is the upper limit (300 nm) of the above range or less, the flexibility (flexibility) of the inorganic deposition layer 6 is excellent and cracks due to external factors such as folding and pulling are unlikely to occur.

It is possible to calculate the thickness of the inorganic deposition layer 6 from the result of a calibration curve obtained by measuring a similar sample in advance with a transmission electron microscope (TEM) using a fluorescent X-ray analyzer, for example.

Method for Manufacturing Gas Barrier Laminate

It is possible to manufacture the gas barrier laminate 30 by a manufacturing method including, for example, the following steps (γ1), (γ2), and (γ3).

(γ1): a step of forming an inorganic deposition layer 6 on one surface of the base material 1.

(γ2): a step of forming the first layer 3 on the surface of the inorganic deposition layer 6 opposite to the base material 1, the inorganic deposition layer 6 being formed on the base material 1.

(γ3): a step of forming the second layer 4 on a surface of the first layer 3 opposite to the inorganic deposition layer 6, the first layer 3 being formed on the base material 1 and the inorganic deposition layer 6.

Step (γ1)

As a method for forming the inorganic deposition layer 6, it is possible to use various known vapor deposition methods.

Examples thereof include a vacuum deposition method, a sputtering method, an ion plating method, a chemical vapor deposition method, and the like.

An electron beam heating method, a resistance heating method, an induction heating method, or the like is preferably used as a means for heating the vacuum vapor deposition apparatus according to the vacuum vapor deposition method. In addition to the above-described heating means, it is also possible to use a plasma assist method or an ion beam assist method to improve the adhesion of the inorganic deposition layer 6 to the base material 1 and the denseness of the inorganic deposition layer 6.

At the time of vapor deposition, in order to improve the transparency of the inorganic deposition layer 6, reactive vapor deposition may be carried out in which oxygen gas or the like is blown thereon.

Step (γ2)

It is possible to perform step (γ2) in the same manner as step (α1) in the second embodiment.

Step (γ3)

It is possible to perform step (γ3) in the same manner as step (α2) in the second embodiment.

Action and Effect

The gas barrier laminate 30 has the gas barrier layer 2 having the second layer 4 which is the layer (A) formed from the coating liquid (a) according to the first embodiment of the present invention, and the first layer 3 which is the layer (B) containing a polycarboxylate polymer. Therefore, in the same manner as the second embodiment, the hot water resistance is excellent and the transparency and adhesion between layers are also excellent. In addition, providing the inorganic deposition layer 6 makes the gas barrier property superior.

In the same manner as the gas barrier laminate 10 of the second embodiment, it is possible to use the gas barrier laminate 30 as a packaging material for foods, beverages, pharmaceuticals, and precision metal parts such as electronic parts, and the same applies to preferable embodiments.

Fifth Embodiment

Figure 4:
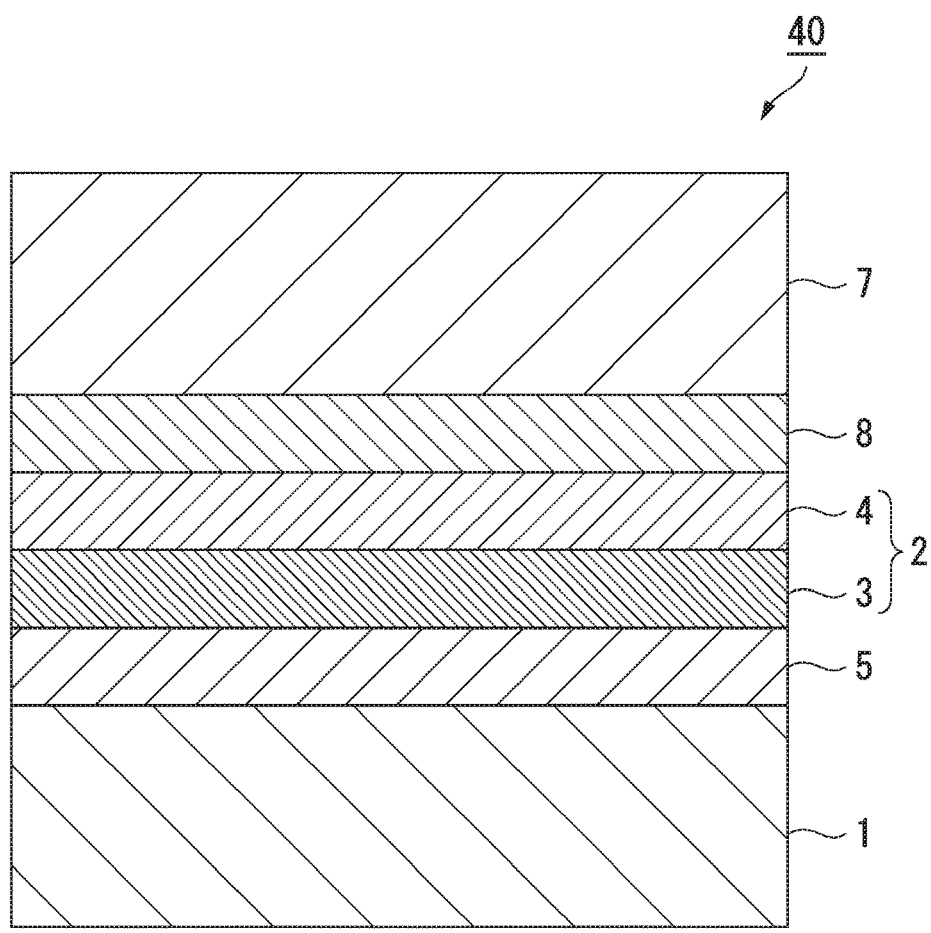
FIG. 4 is a cross-sectional view schematically showing a gas barrier laminate according to a fifth embodiment of the present invention.

FIG. 4 is a cross-sectional view schematically showing a gas barrier laminate of a fifth embodiment of the present invention.

The gas barrier laminate 40 of the present embodiment includes the base material 1, the anchor coat layer 5, the gas barrier layer 2, and another base material 7. The anchor coat layer 5 is laminated on one surface (a first surface) of the base material 1. The gas barrier layer 2 is laminated on the anchor coat layer 5. The other base material 7 is laminated on the gas barrier layer 2 via the adhesive layer 8. The gas barrier layer 2 has the first layer 3 and the second layer 4 laminated in order from the side of the base material 1.

The gas barrier laminate 40 is the same as the gas barrier laminate 20 of the third embodiment except that the other base material 7 is further laminated on the gas barrier layer 2 via the adhesive layer 8.

Other Base Material

The other base material 7 is appropriately selected according to the purpose, and plastic films are preferable. The other base material 7 may be a laminate having two or more layers.

Examples of the material of the other base material 7 include polyolefin, nylon, inorganic vapor deposition nylon, and the like.

The thickness of the other base material 7 is preferably 1 μm to 1000 μm, and more preferably 5 μm to 500 μm.

Adhesive Layer

The adhesive layer 8 is not particularly limited, but in the case of lamination of the other base material 7 by, for example, a dry lamination method, it is possible to use a one-liquid type or two-liquid type polyurethane type adhesive or an acrylic type adhesive. In a case of laminating the other base material 7 by an extrusion lamination method, it is possible to use a resin having adhesion such as an ethylene-vinyl acetate copolymer, an ethylene-acrylic acid copolymer, an ethylene-methacrylic acid copolymer, an ionomer resin, or the like.

Method for Manufacturing Gas Barrier Laminate

It is possible to manufacture the gas barrier laminate 40 by a manufacturing method including, for example, the following steps (δ1), (δ2), (δ3), and (δ4).

(δ1): a step of forming the anchor coat layer 5 on one surface of the base material 1.

(δ2): a step of forming the first layer 3 on the surface of the anchor coat layer 5 opposite to the base material 1, the anchor coat layer 5 being formed on the base material 1.

(δ3): a step of forming the second layer 4 on a surface of the first layer 3 opposite to the anchor coat layer 5, the first layer 3 being formed on the base material 1 and the anchor coat layer 5.

(δ4): a step of laminating the other base material 7 via the adhesive layer 8 on the surface of the second layer 4 opposite to the first layer, the second layer 4 being formed on the first layer 3 and the anchor coat layer 5 of the base material 1.

Step (δ1)

It is possible to perform step (δ1) in the same manner as step (β1) in the third embodiment.

Step (δ2)

It is possible to perform step (δ2) in the same manner as step (β2) in the third embodiment.

Step (δ3)

It is possible to perform step (δ3) in the same manner as step (β3) in the third embodiment.

Step (δ4)

The laminating method of the other base material 7 is not particularly limited, and examples thereof include a dry lamination method and an extrusion lamination method.

The method of coating the adhesive in the dry lamination method is not particularly limited, and examples thereof include a gravure coating method.

Action and Effect

The gas barrier laminate 40 has the gas barrier layer 2 having the second layer 4 which is the layer (A) formed from the coating liquid (a) according to the first embodiment of the present invention, and the first layer 3 which is the layer (B) containing a polycarboxylate polymer. Therefore, as in the second embodiment, the hot water resistance is excellent and the transparency and adhesion between layers are also excellent. In addition, providing the anchor coat layer 5 makes the adhesion between the base material 1 and the gas barrier layer 2 superior.

In addition, it is possible to impart various physical properties using the other base material 7. Specifically, it is possible to impart strength, to impart sealing properties and ease of opening when sealed, to impart designability, to impart light blocking properties, to impart moisture resistance, and the like. Furthermore, when carrying out a retort treatment, a boiling treatment, or the like, the gas barrier layer 2 is not directly exposed to hot water or steam, and the appearance is improved.

In the same manner as the gas barrier laminate 10 of the second embodiment, it is possible to use the gas barrier laminate 40 as a packaging material for foods, beverages, pharmaceuticals, and precision metal parts such as electronic parts, and the same applies to preferable embodiments.

The gas barrier laminate of the present invention and the method for manufacturing the same have been described with reference to the first to fifth embodiments, but the present invention is not limited to these embodiments. The configurations, combinations thereof, and the like in the above embodiments are merely examples, and additions, omissions, substitutions, and other modifications to the configurations are possible without departing from the spirit of the present invention.

For example, in the gas barrier layer of the gas barrier laminate, the layer (A) and the layer (B) may not be adjacent to each other. In terms of the productivity of the gas barrier laminate, it is preferable that the layer (A) and the layer (B) are adjacent.

Each of the layers (A) and (B) of the gas barrier layer may be one layer or may be two or more layers.

In addition, in the second to fifth embodiments, examples in which the layer (B)/layer (A) are laminated in order from the base material side are shown. However, the layer (A)/layer (B) may be laminated in this order from the base material side.

Examples of preferable layer structures of the gas barrier layer include a two-layer configuration such as, from the base material side, layer (A)/layer (B) or layer (B)/layer (A), a three-layer configuration such as layer (A)/layer (B)/layer (A) or layer (B)/layer (A)/layer (B), a four-layer configuration such as layer (A)/layer (B)/layer (A)/layer (B) or layer (B)/layer (A)/layer (B)/layer (A), or the like. In terms of appearance, a two-layer structure in which the layer (B)/layer (A) is laminated in order from the base material side is preferable.

In the second to fifth embodiments, an example is shown in which the gas barrier layer is laminated on one surface (first surface) of the base material. However, the gas barrier layer may be laminated on both surfaces (the first surface and the second surface) of the base material.

The fourth embodiment may be configured to further have an anchor coat layer between the inorganic vapor deposition layer and the gas barrier layer. The fifth embodiment may be configured without an anchor coat layer.

In the fifth embodiment, an example in which another base material is laminated on the gas barrier layer is shown. However, the other base material may be laminated on the base material or laminated on both the gas barrier layer and the base material. For example, a layer configuration of other base material/adhesive layer/base material/gas barrier layer or a layer configuration of other base material/adhesive layer/base material/gas barrier layer/adhesive layer/other base material layer may be used.

Printing or vapor deposition may be applied to the other base material 7 from the viewpoints of imparting designability, imparting a light blocking property, imparting moisture resistance, and the like.

EXAMPLES

A detailed description will be given below of the present invention by showing Examples. However, the present invention is not limited to these Examples.

Materials used in Preparation Examples 1 to 22 are shown below.

Materials Used

Ultrafine zinc oxide particles: FINEX 50 manufactured by Sakai Chemical Industry Co., Ltd., average primary particle diameter 20 nm.

Ammonium polycarboxylate (1): Aron A-30SL manufactured by Toagosei Co., Ltd., solid content concentration 40 mass %, average molecular weight 6,000.

Ammonium polycarboxylate (2): Aron A-6114 manufactured by Toagosei Co., Ltd., solid content concentration 40 mass %, average molecular weight 8,000.

Ammonium polycarboxylate (3): Shallol AH-103P manufactured by DKS Co., Ltd., solid content concentration 44 mass %, average molecular weight 10,000.

Ammonium polycarboxylate (4): SN Dispersant 5020 manufactured by San Nopco Limited, solid content concentration: 40 mass %, average molecular weight: 30,000.

Sodium polycarboxylate (5): Poise 521 manufactured by Kao Corporation, solid content concentration 40 mass %, average molecular weight 20,000.

Aqueous polyester resin dispersion (6): Elitel KT-8803 manufactured by Unitika Ltd., solid content concentration: 30 mass %, number average molecular weight of polyester resin: 13,000, Tg: 65° C., acid value: 7 mg KOH/g.

Aqueous polyester resin dispersion (7): Vylonal MD-1200 manufactured by Toyobo Co., Ltd., solid content concentration: 34 mass %, number average molecular weight of polyester resin: 15,000, Tg: 67° C., acid value: less than 3 mg KOH/g.

Aqueous polyester resin dispersion (8): Pesresin A 124 GP, manufactured by Takamatsu Oil & Fat Co., Ltd., solid content concentration: 25 mass %, number average molecular weight of polyester resin: 15,000, Tg: 55° C., acid value: less than 2 mg KOH/g.

Aqueous polyester resin dispersion (9): Elitel KA-3556 manufactured by Unitika Ltd., solid content concentration: 30 mass %, number average molecular weight of the polyester resin: 8,000, Tg: 83° C., acid value: 18 mg KOH/g.

Water-dispersible isocyanate compound (10): Basonat HW 1000 NG manufactured by BASF, solid content concentration: 100 mass %.

Water-dispersible isocyanate compound (11): Duranate WB 40-100 manufactured by Asahi Kasei Chemicals Corporation, solid content concentration: 100 mass %.

Preparation of Coating Liquid

Preparation Example 1

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.05 g of distilled water, 16.5 g of the aqueous polyester resin dispersion (6), and 0.98 g of the water-dispersible isocyanate compound (10) were added to 5.0 g of the aqueous dispersion of ultrafine zinc oxide particles and the mixture was stirred. Thereafter, 8.5 g of isopropyl alcohol (abbreviated below as IPA) was added thereto and stirred to obtain a coating liquid (a-1) (solid content concentration: 15 mass %).

Preparation Example 2

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.4 g of distilled water, 8.6 g of the aqueous polyester resin dispersion (6) and 0.98 g of the water-dispersible isocyanate compound (10) were added to 12.5 g of the aqueous ultrafine zinc oxide particle dispersion, and the mixture was stirred. Thereafter, 8.5 g of IPA was added and stirred to obtain a coating liquid (a-2) (solid content concentration: 15 mass %).

Preparation Example 3

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.65 g of distilled water, 3.38 g of the aqueous polyester resin dispersion (6), and 0.98 g of the water-dispersible isocyanate compound (10) were added to 17.5 g of the aqueous ultrafine zinc oxide particle dispersion, and the mixture was stirred. Thereafter, 8.5 g of IPA was added and stirred to obtain a coating liquid (a-3) (solid content concentration: 15 mass %).

Preparation Example 4

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 18.24 g of distilled water, 0.50 g of the aqueous polyester resin dispersion (6), and 0.26 g of the water-dispersible isocyanate compound (10) were added to 22.5 g of the aqueous dispersion of ultrafine zinc oxide particles and the mixture was stirred. Thereafter, 8.5 g of IPA was added thereto and stirred to obtain a coating liquid (a-4) (solid content concentration: 15 mass %).

Preparation Example 5

30.0 g of ultrafine zinc oxide particles and 1.07 g of ammonium polycarboxylate (1) as a dispersing agent were added to 68.9 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.05 g of distilled water, 4.0 g of the aqueous polyester resin dispersion (6), and 0.98 g of the water-dispersible isocyanate compound (10) were added to 17.5 g of the aqueous ultrafine zinc oxide particle dispersion and the mixture was stirred. Thereafter, 8.5 g of IPA was added thereto and stirred to obtain a coating liquid (a-5) (solid content concentration: 15 mass %).

Preparation Example 6

30.0 g of ultrafine zinc oxide particles and 7.5 g of ammonium polycarboxylate (1) as a dispersing agent were added to 62.5 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 20.55 g of distilled water, 2.5 g of the aqueous polyester resin dispersion (6), and 0.98 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-6) (solid content concentration: 15 mass %).

Preparation Example 7

30.0 g of ultrafine zinc oxide particles and 16.05 g of ammonium polycarboxylate (1) as a dispersing agent were added to 53.95 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 22.53 g of distilled water, 0.50 g of the aqueous polyester resin dispersion (6), and 0.98 g of the water-dispersible isocyanate compound (10) were added to 17.5 g of the aqueous zinc oxide ultrafine dispersion, and the mixture was stirred. Thereafter, 8.5 g of IPA was added thereto and stirred to obtain a coating liquid (a-7) (solid content concentration: 15 mass %).

Preparation Example 8

30.0 g of ultrafine zinc oxide particles and 23.1 g of ammonium polycarboxylate (1) as a dispersing agent were added to 46.9 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 23.8 g of distilled water, 0.5 g of the aqueous polyester resin dispersion (6), and 0.98 g of the water-dispersible isocyanate compound (10) were added to 16.25 g of the aqueous zinc oxide ultrafine dispersion, and the mixture was stirred. Thereafter, 8.5 g of IPA was added thereto and stirred to obtain a coating liquid (a-8) (solid content concentration: 15 mass %).

Preparation Example 9

30.0 g of ultrafine zinc oxide particles and 3.75 g of ammonium polycarboxylate (2) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.65 g of distilled water, 3.38 g of the aqueous polyester resin dispersion (6), and 0.98 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-9) (solid content concentration: 15 mass %).

Preparation Example 10

30.0 g of ultrafine zinc oxide particles and 3.41 g of ammonium polycarboxylate (3) as a dispersing agent were added to 66.6 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.65 g of distilled water, 3.38 g of the aqueous polyester resin dispersion (6), and 0.98 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-10) (solid content concentration: 15 mass %).

Preparation Example 11

30.0 g of ultrafine zinc oxide particles and 3.75 g of ammonium polycarboxylate (4) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.65 g of distilled water, 3.38 g of the aqueous polyester resin dispersion (6), and 0.98 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-11) (solid content concentration: 15 mass %).

Preparation Example 12

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 20.05 g of distilled water, 2.98 g of aqueous polyester resin dispersion (7), and 0.98 g of water-dispersible isocyanate compound (10) were added to 17.5 g of the aqueous dispersion of ultrafine zinc oxide particles, and the mixture was stirred. Thereafter, 8.5 g of IPA was added thereto and stirred to obtain a coating liquid (a-12) (solid content concentration: 15 mass %).

Preparation Example 13

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.0 g of distilled water, 4.05 g of the aqueous polyester resin dispersion (8), and 0.98 g of the water-dispersible isocyanate compound (10) were added to 17.5 g of this aqueous ultrafine zinc oxide particle dispersion, and the mixture was stirred. Thereafter, 8.5 g of IPA was added thereto and stirred to obtain a coating liquid (a-13) (solid content concentration: 15 mass %).

Preparation Example 14

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.65 g of distilled water, 3.38 g of the aqueous polyester resin dispersion (6), and 0.98 g of the water-dispersible isocyanate compound (11) were added to 17.5 g of the aqueous ultrafine zinc oxide particle dispersion, and the mixture was stirred. Thereafter, 8.5 g of IPA was added thereto and stirred to obtain a coating liquid (a-14) (solid content concentration: 15 mass %).

Preparation Example 15

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 28.2 g of distilled water, 3.38 g of the aqueous polyester resin dispersion (6), and 0.98 g of the water-dispersible isocyanate compound (10) were added to 17.5 g of the aqueous ultrafine zinc oxide particle dispersion and stirred to obtain a coating liquid (a-15) (solid content concentration: 15 mass %).

Preparation Example 16

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 17.4 g of distilled water and 6.65 g of aqueous polyester resin dispersion (6) were added to 17.5 g of the aqueous ultrafine zinc oxide particle dispersion and the mixture was stirred. Thereafter, 8.5 g of IPA was added thereto and stirred to obtain a coating liquid (a-16) (solid content concentration: 15 mass %).

Preparation Example 17

30.0 g of ultrafine zinc oxide particles was added to 70.0 g of distilled water and sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 18.8 g of distilled water, 4.25 g of the aqueous polyester resin dispersion (6), and 0.98 g of the water-dispersible isocyanate compound (10) were added to 17.5 g of the aqueous zinc oxide ultrafine dispersion, and the mixture was stirred. Thereafter, 8.5 g of IPA was added thereto and stirred to obtain a coating liquid (a-17) (solid content concentration: 15 mass %).

Preparation Example 18

30.0 g of ultrafine zinc oxide particles and 0.53 g of ammonium polycarboxylate (1) as a dispersing agent were added to 69.5 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 18.9 g of distilled water, 4.13 g of the aqueous polyester resin dispersion (6), and 0.98 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-18) (solid content concentration: 15 mass %).

Preparation Example 19

30.0 g of ultrafine zinc oxide particles and 26.8 g of ammonium polycarboxylate (1) as a dispersing agent were added to 43.2 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 23.25 g of distilled water, 0.50 g of the aqueous polyester resin dispersion (6), and 0.23 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-19) (solid content concentration: 15 mass %).

Preparation Example 20

30.0 g of ultrafine zinc oxide particles and 3.75 g of sodium polycarboxylate (5) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.65 g of distilled water, 3.38 g of the aqueous polyester resin dispersion (6), and 0.98 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-20) (solid content concentration: 15 mass %).

Preparation Example 21

30.0 g of ultrafine zinc oxide particles and 3.75 g of ammonium polycarboxylate (1) as a dispersing agent were added to 66.3 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 19.65 g of distilled water, 3.38 g of the aqueous polyester resin dispersion (9), and 0.98 g of the water-dispersible isocyanate compound (10) were added to 17.5 g of the aqueous ultrafine zinc oxide particle dispersion, and the mixture was stirred. Thereafter, 8.5 g of IPA was added thereto and stirred to obtain a coating liquid (a-21) (solid content concentration: 15 mass %).

Preparation Example 22

30.0 g of ultrafine zinc oxide particles and 18.2 g of ammonium polycarboxylate (1) as a dispersing agent were added to 51.8 g of distilled water, and the mixture was sufficiently stirred with a stirrer. Thereafter, 30.0 g thereof was thoroughly dispersed using zirconia beads having a diameter of 0.3 mm with a planetary ball mill (P-7 manufactured by Fritsch). Thereafter, the zirconia beads were separated by a sieve to obtain an aqueous dispersion of ultrafine zinc oxide particles. 23.05 g of distilled water and 0.98 g of the water-dispersible isocyanate compound (10) were added to 17.5 g of the aqueous ultrafine zinc oxide particle dispersion and the mixture was stirred. Thereafter, 8.5 g of IPA was added thereto and stirred to obtain a coating liquid (a-22) (solid content concentration: 15 mass %).

Preparation Example b-1

80 g of polyacrylic acid having a number average molecular weight of 200,000 (Aron A-10 H: 25 mass % aqueous solution, manufactured by Toagosei Co., Ltd.) was dissolved in 117.7 g of distilled water, and 2.3 g of zinc oxide (manufactured by Wako Pure Chemical Industries, Ltd.) was added thereto to neutralize 20 mol % of the carboxyl groups of the polyacrylic acid. Thereafter, distilled water was added to adjust the solid content concentration to 10 mass % to obtain a coating liquid (b-1).

Preparation Example b-2

37.6 g of distilled water was added to 24.3 g of the above coating liquid (b-1) and stirred thoroughly. Thereafter, 0.15 g of γ-glycidoxypropyltrimethoxysilane (GPTMS, manufactured by Shin-Etsu Silicone Co., Ltd.) was added thereto and hydrolysis and condensation reactions were carried out over 1 hour. Thereafter, 38.0 g of IPA was added thereto and stirred to obtain a coating liquid (b-2).

Example 1

A polyester base agent (Takelac A 525 manufactured by Mitsui Chemicals Polyurethane Co., Ltd., solid content concentration: 50 mass %) and a curing agent (Takenate A 52 manufactured by Mitsui Chemical Polyurethane Co., Ltd., solid content concentration 75 mass %) were dissolved in a solvent (ethyl acetate) so as to have a mass ratio (base agent/curing agent) of 9/1. Due to this, a coating liquid for an anchor coat layer having a solid content concentration of 5 mass % was obtained. The obtained anchor coat layer coating liquid was applied onto a polyester film (Lumirror P60, manufactured by Toray Industries, Inc., thickness: 12 μm) using a bar coater (K303 bar manufactured by RK Print-Coat Instruments) such that a mass per unit area after drying was 0.20 g/m$^2$ and the thickness was 0.2 μm. Thereafter, the liquid was dried with a dryer to form an anchor coat layer.

The coating liquid (b-1) was coated on the formed anchor coat layer using the bar coater such that the mass per unit area after drying was 0.40 g/m$^2$ and the thickness was 0.3 μm, and then dried to form a layer.

Subsequently, the coating liquid (a-3) was applied onto the layer formed from the coating liquid (b-1) using the bar coater such that the mass per unit area after drying was 0.60 g/m$^2$ and the thickness was 0.45 μm, and then dried to form a layer.

In this manner, a gas barrier laminate was obtained in which an anchor coat layer, a layer (layer (B)) formed from the coating liquid (b-1), and a layer (layer (A)) formed from the coating liquid (a-3) were laminated in this order on the polyester film.

Example 2

A gas barrier laminate was obtained in the same manner as in Example 1 except that the coating liquid (b-2) was used in place of the coating liquid (b-1), the coating liquid (a-1) was used in place of the coating liquid (a-3), and the coating of the coating liquid (a-1) was performed such that the mass per unit area after drying was 0.17 g/m$^2$ and the thickness was 0.45 μm.

Example 3

A gas barrier laminate was obtained in the same manner as in Example 1 except that the coating liquid (b-2) was used in place of the coating liquid (b-1), the coating liquid (a-2) was used in place of the coating liquid (a-3), and the coating of the coating liquid (a-2) was performed such that the mass per unit area after drying was 0.43 g/m$^2$ and the thickness was 0.45 μm.

Example 4

A gas barrier laminate was obtained in the same manner as in Example 1 except that the coating liquid (b-2) was used in place of the coating liquid (b-1).

Example 5

A gas barrier laminate was obtained in the same manner as in Example 1 except that the coating liquid (b-2) was used in place of the coating liquid (b-1), the coating liquid (a-4) was used in place of the coating liquid (a-3), and the coating of the coating liquid (a-4) was performed such that the mass per unit area after drying was 0.77 g/m$^2$ and the thickness was 0.45 μm.

Example 6

A gas barrier laminate was obtained in the same manner as in Example 1 except that the coating liquid (b-2) was used in place of the coating liquid (b-1) and the coating liquid (a-5) was used in place of the coating liquid (a-3).

Example 7

A gas barrier laminate was obtained in the same manner as in Example 1 except that the coating liquid (b-2) was used in place of the coating liquid (b-1) and the coating liquid (a-6) was used in place of the coating liquid (a-3).

Example 8

A gas barrier laminate was obtained in the same manner as in Example 1 except that the coating liquid (b-2) was used in place of the coating liquid (b-1) and the coating liquid (a-7) was used in place of the coating liquid (a-3).

Example 9

A gas barrier laminate was obtained in the same manner as in Example 1 except that the coating liquid (b-2) was used in place of the coating liquid (b-1), the coating liquid (a-8) was used in place of the coating liquid (a-3), and the coating of the coating liquid (a-8) was performed such that the mass per unit area after drying was 0.56 g/m2 and the thickness was 0.45 μm.

Example 10

A gas barrier laminate was obtained in the same manner as in Example 1 except that the coating liquid (b-2) was used in place of the coating liquid (b-1), and the coating liquid (a-9) was used in place of the coating liquid (a-3).

Example 11

A gas barrier laminate was obtained in the same manner as in Example 1 except that the coating liquid (b-2) was used in place of the coating liquid (b-1), and the coating liquid (a-10) was used in place of the coating liquid (a-3).

Example 12

A gas barrier laminate was obtained in the same manner as in Example 1 except that the coating liquid (b-2) was used in place of the coating liquid (b-1), and the coating liquid (a-11) was used in place of the coating liquid (a-3).

Example 13

A gas barrier laminate was obtained in the same manner as in Example 1 except that the coating liquid (b-2) was used in place of the coating liquid (b-1), and the coating liquid (a-12) was used in place of the coating liquid (a-3).

Example 14

A gas barrier laminate was obtained in the same manner as in Example 1 except that the coating liquid (b-2) was used in place of the coating liquid (b-1), and the coating liquid (a-13) was used in place of the coating liquid (a-3).

Example 15

A gas barrier laminate was obtained in the same manner as in Example 1 except that the coating liquid (b-2) was used in place of the coating liquid (b-1), and the coating liquid (a-14) was used in place of the coating liquid (a-3).

Example 16

A gas barrier laminate was obtained in the same manner as in Example 1 except that the coating liquid (b-2) was used in place of the coating liquid (b-1), and the coating liquid (a-15) was used in place of the coating liquid (a-3).

Example 17

A gas barrier laminate was obtained in the same manner as in Example 1 except that the coating liquid (b-2) was used in place of the coating liquid (b-1), and the coating liquid (a-16) was used in place of the coating liquid (a-3).

Comparative Example 1

A gas barrier laminate was obtained in the same manner as in Example 1 except that the coating liquid (b-2) was used in place of the coating liquid (b-1), and the coating liquid (a-17) was used in place of the coating liquid (a-3).

Comparative Example 2

A gas barrier laminate was obtained in the same manner as in Example 1 except that the coating liquid (b-2) was used in place of the coating liquid (b-1), and the coating liquid (a-18) was used in place of the coating liquid (a-3).

Comparative Example 3

A gas barrier laminate was obtained in the same manner as in Example 1 except that the coating liquid (b-2) was used in place of the coating liquid (b-1), and the coating liquid (a-19) was used in place of the coating liquid (a-3).

Comparative Example 4

A gas barrier laminate was obtained in the same manner as in Example 1 except that the coating liquid (b-2) was used in place of the coating liquid (b-1), and the coating liquid (a-20) was used in place of the coating liquid (a-3).

Comparative Example 5

A gas barrier laminate was obtained in the same manner as in Example 1 except that the coating liquid (b-2) was used in place of the coating liquid (b-1), and the coating liquid (a-21) was used in place of the coating liquid (a-3).

Comparative Example 6

A gas barrier laminate was obtained in the same manner as in Example 1 except that the coating liquid (b-2) was used in place of the coating liquid (b-1), and the coating liquid (a-22) was used in place of the coating liquid (a-3).

The type of the coating liquid (a) used for forming the layer (A), the type of the coating liquid (b) used for forming the layer (B), and the solid content in coating liquid (a) in each of the Examples and Comparative Examples are shown in Table 1. In Table 1, the polyester resins (6) to (9) represent polyester resins derived from the aqueous polyester resin dispersions (6) to (9), respectively.

The gas barrier laminates obtained in Examples and Comparative Examples were subjected to the following evaluations. The results are shown in Table 2.

(i) Haze (Transparency) of Gas Barrier Laminate:

For evaluation of transparency, the haze of the gas barrier laminates obtained in Examples and Comparative Examples was measured using a haze meter (Haze Meter NDH 2000, manufactured by Nippon Denshoku Industries Co., Ltd.) in accordance with the method described in JIS K-7136.

(ii) Oxygen Permeability after Retort Treatment (Hot Water Resistance):

A biaxially stretched nylon film (ONUM manufactured by Unitika Ltd., thickness: 15 µm) and an unstretched polypropylene film (ZK 93-FM manufactured by Toray Film Processing Co., Ltd., thickness 60 µm) were adhered in this order on the layer (A) of the gas barrier laminates obtained in Examples and Comparative Examples using a dry lamination method via a polyurethane adhesive (main agent: Takelac A 620 manufactured by Mitsui Chemical Polyurethane Industry Co., Ltd., curing agent: Takenate A 65 manufactured by Mitsui Chemical Polyurethane Industry Co., Ltd., main agent/curing agent mass ratio=16/1) to obtain a laminated film.

The obtained laminated film was subjected to a retort treatment at a temperature of 121° C. for 30 minutes using a retort processor (RCS-60 manufactured by Hisaka Ltd.).

With respect to the laminated film after the retort treatment, the oxygen permeability ($cm^3/(m^2 \cdot day \cdot MPa)$) of the laminated film was measured under the conditions of a temperature of 30° C., a sample area of 50 $cm^2$, and 70% relative humidity (RH) on both sides using an oxygen permeability tester (TMOX-TRAN 2/20, manufactured by Modern Control) according to the method described in JIS K 7126 B method (isostatic method) and ASTM D3985.

(iii) Liquid Stability of Coating Liquid (a) (Dispersion Stability of Ultrafine Zinc Oxide Particles):

With respect to the coating liquids (a-1) to (a-22) used for forming the layer (A) in Examples and Comparative Examples, the presence or absence of sedimentation of the ultrafine zinc oxide particles was visually evaluated immediately after preparation.

TABLE 1

| | Coating Liquid | | Solid Content in Coating Solution (a) | | | | | | | |
|---|---|---|---|---|---|---|---|---|---|---|
| | | | Ultrafine zinc oxide particles | Dispersing Agent | | | Polyester Resin | | Water-dispersible isocyanate compound | |
| | | | Solid Content with respect to Whole | | Solid Content with respect to Whole | With respect to Ultrafine zinc oxide particles | | Solid Content with respect to Whole | | Solid Content with respect to Whole |
| | (a) | (b) | (mass %) | Type | (mass %) | (mass %) | Type | (mass %) | Type | (mass %) |
| Example 1 | (a-3) | (b-1) | 70 | (1) | 3.5 | 5 | (6) | 13.5 | (10) | 13 |
| Example 2 | (a-1) | (b-2) | 20 | (1) | 1 | 5 | (6) | 66 | (10) | 13 |
| Example 3 | (a-2) | (b-2) | 50 | (1) | 2.5 | 5 | (6) | 34.5 | (10) | 13 |
| Example 4 | (a-3) | (b-2) | 70 | (1) | 3.5 | 5 | (6) | 13.5 | (10) | 13 |
| Example 5 | (a-4) | (b-2) | 90 | (1) | 4.5 | 5 | (6) | 2 | (10) | 3.5 |
| Example 6 | (a-5) | (b-2) | 70 | (1) | 1 | 1.4 | (6) | 16 | (10) | 13 |
| Example 7 | (a-6) | (b-2) | 70 | (1) | 7 | 10 | (6) | 10 | (10) | 13 |
| Example 8 | (a-7) | (b-2) | 70 | (1) | 15 | 21.4 | (6) | 2 | (10) | 13 |
| Example 9 | (a-8) | (b-2) | 65 | (1) | 20 | 30.8 | (6) | 2 | (10) | 13 |
| Example 10 | (a-9) | (b-2) | 70 | (2) | 3.5 | 5 | (6) | 13.5 | (10) | 13 |
| Example 11 | (a-10) | (b-2) | 70 | (3) | 3.5 | 5 | (6) | 13.5 | (10) | 13 |
| Example 12 | (a-11) | (b-2) | 70 | (4) | 3.5 | 5 | (6) | 13.5 | (10) | 13 |
| Example 13 | (a-12) | (b-2) | 70 | (1) | 3.5 | 5 | (7) | 13.5 | (10) | 13 |
| Example 14 | (a-13) | (b-2) | 70 | (1) | 3.5 | 5 | (8) | 13.5 | (10) | 13 |
| Example 15 | (a-14) | (b-2) | 70 | (1) | 3.5 | 5 | (6) | 13.5 | (11) | 13 |
| Example 16 | (a-15) | (b-2) | 70 | (1) | 3.5 | 5 | (6) | 13.5 | (10) | 13 |
| Example 17 | (a-16) | (b-2) | 70 | (1) | 3.5 | 5 | (6) | 26.5 | — | 0 |
| Comparative Example 1 | (a-17) | (b-2) | 70 | — | 0 | 0 | (6) | 17 | (10) | 13 |
| Comparative Example 2 | (a-18) | (b-2) | 70 | (1) | 0.5 | 0.7 | (6) | 16.5 | (10) | 13 |
| Comparative Example 3 | (a-19) | (b-2) | 70 | (1) | 25 | 35.7 | (6) | 2 | (10) | 3 |
| Comparative Example 4 | (a-20) | (b-2) | 70 | (5) | 3.5 | 5 | (6) | 13.5 | (10) | 13 |
| Comparative Example 5 | (a-21) | (b-2) | 70 | (1) | 3.5 | 5 | (9) | 13.5 | (10) | 13 |
| Comparative Example 6 | (a-22) | (b-2) | 70 | (1) | 17 | 24.3 | — | 0 | (10) | 13 |

TABLE 2

| | Haze of Gas Barrier Laminate (%) | Oxygen Permeability of laminated film (cm$^3$/(m$^2$ · day · MPa)) | Stability of Coating Liquid (a) |
|---|---|---|---|
| Example 1 | 3.5 | 1.0 | No precipitate |
| Example 2 | 3.5 | 5.0 | No precipitate |
| Example 3 | 3.5 | 2.0 | No precipitate |
| Example 4 | 3.5 | 1.0 | No precipitate |
| Example 5 | 3.5 | 1.0 | No precipitate |
| Example 6 | 3.5 | 2.0 | No precipitate |
| Example 7 | 3.5 | 1.0 | No precipitate |
| Example 8 | 3.5 | 1.0 | No precipitate |
| Example 9 | 3.5 | 1.5 | No precipitate |
| Example 10 | 3.5 | 1.0 | No precipitate |
| Example 11 | 3.5 | 1.0 | No precipitate |
| Example 12 | 3.5 | 1.0 | No precipitate |
| Example 13 | 3.5 | 2.0 | No precipitate |
| Example 14 | 3.5 | 2.0 | No precipitate |
| Example 15 | 3.5 | 2.0 | No precipitate |
| Example 16 | 3.5 | 2.0 | No precipitate |
| Example 17 | 5 | 5.0 | No precipitate |
| Comparative Example 1 | 30 | 300 | Precipitate |
| Comparative Example 2 | 30 | 300 | Precipitate |
| Comparative Example 3 | 5 | 200 | Precipitate |
| Comparative Example 4 | 30 | 100 | Precipitate |
| Comparative Example 5 | 5 | 100 | No precipitate |
| Comparative Example 6 | 30 | 300 | No precipitate |

As shown in the above results, the coating liquid used for forming the layer (A) in Examples 1 to 17 had good liquid stability. In addition, the gas barrier laminates having a layer formed using these coating liquids were excellent in hot water resistance and transparency.

On the other hand, the gas barrier laminate was inferior in hot water resistance in Comparative Examples 1 to 3 in which the amount of ammonium polycarboxylate in the coating liquid used for forming layer (A) was less than 1 mass % or more than 35 mass % with respect to the ultrafine zinc oxide particles, Comparative Example 4 in which sodium polycarboxylate was used instead of ammonium polycarboxylate, Comparative Example 5 in which the acid value of the polyester resin exceeds 15 mg KOH/g, and Comparative Example 6 in which no polyester resin was used. In particular, in Comparative Examples 1 to 4, the dispersion stability of the ultrafine zinc oxide particles of the coating liquid was also poor. In addition, in Comparative Examples 1, 2, 4, and 6, the transparency of the gas barrier laminate was also low.

The coating liquid of the present invention is an aqueous coating liquid in which the dispersion stability of ultrafine zinc oxide particles is good. A gas barrier laminate having a layer formed from the coating liquid is excellent in hot water resistance and exhibits excellent gas barrier properties even after hot water treatment. In addition, the gas barrier laminate is also excellent in transparency.

For this reason, it is possible to use the gas barrier laminate of the present invention as a packaging material for foods, beverages, medicine, pharmaceuticals, and precision metal parts such as electronic parts, and among these, it is possible to suitably use the gas barrier laminate of the present invention as a packaging material for foods.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

DESCRIPTION OF REFERENCE NUMERAL

1: base material
2: gas barrier layer
3: first layer (layer (B))
4: second layer (layer (A))
5: anchor coat layer
6: inorganic deposition layer
7: other base material
8: adhesive layer
10: gas barrier laminate
20: gas barrier laminate
30: gas barrier laminate
40: gas barrier laminate

What is claimed is:

1. A gas barrier laminate comprising:
   a base material; and
   a gas barrier layer formed on the base material and comprising a layer (A) formed from a coating liquid, and a layer (B) containing polycarboxylate polymers, each polymer of polycarboxylate polymers having two or more carboxyl groups, wherein
      the coating liquid comprises ultrafine zinc oxide particles, a polyester resin, an ammonium polycarboxylate salt, and water,
      an amount of the ultrafine zinc oxide particles is from 65 mass % to 90 mass % with respect to a solid content of the coating liquid,
      an amount of the ammonium polycarboxylate salt is from 1 mass % to 5 mass % with respect to the ultrafine zinc oxide particles, and
      the polyester resin has an acid value of 15 mg KOH/g or less, and
   the layer (A) and the layer (B) are adjacent to each other in the gas barrier layer.

2. The gas barrier laminate according to claim 1, further comprising:
   another base material laminated on at least one of the base material and the gas barrier layer via an adhesive layer.

3. The gas barrier laminate according to claim 1, wherein a part of carboxyl groups of the polycarboxylate polymers of the layer (B) is a neutralized part of the carboxyl groups of the polycaboxylate polymers.

4. The gas barrier laminate according to claim 1, wherein a degree of neutralization of the carboxyl groups of the polycarboxylate polymers of the layer (B) is 30 mol % or less.

5. The gas barrier laminate according to claim 1, wherein a thickness of the layer (A) is 0.05 μm to 5 μm, and a thickness of the layer (B) is 0.05 μm to 5 μm.

6. The gas barrier laminate according to claim 1, wherein a mass per unit area of the layer (A) is ⅓ or more times a mass per unit area of the layer (B) and 10 or less times a mass per unit area of the layer (B).

* * * * *

UNITED STATES PATENT AND TRADEMARK OFFICE
CERTIFICATE OF CORRECTION

PATENT NO. : 11,078,372 B2  
APPLICATION NO. : 15/955166  
DATED : August 3, 2021  
INVENTOR(S) : Miyu Matsui et al.

Page 1 of 1

It is certified that error appears in the above-identified patent and that said Letters Patent is hereby corrected as shown below:

In the Claims

Column 40, Claim 3, Line 28:
Delete "polycaboxylate" and insert -- polycarboxylate --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*